US012731066B2

(12) United States Patent
Meinders

(10) Patent No.: US 12,731,066 B2
(45) Date of Patent: Sep. 8, 2026

(54) TOOL FOR DESIGNING ARTIFICIAL INTELLIGENCE SYSTEMS

(71) Applicant: Christine Meinders, Altadena, CA (US)

(72) Inventor: Christine Meinders, Altadena, CA (US)

( * ) Notice: Subject to any disclaimer, the term of this patent is extended or adjusted under 35 U.S.C. 154(b) by 324 days.

(21) Appl. No.: 16/382,016

(22) Filed: Apr. 11, 2019

(65) Prior Publication Data

US 2019/0318262 A1 Oct. 17, 2019

Related U.S. Application Data

(60) Provisional application No. 62/656,278, filed on Apr. 11, 2018.

(51) Int. Cl.
*G06N 20/00* (2019.01)

(52) U.S. Cl.
CPC .................................... *G06N 20/00* (2019.01)

(58) Field of Classification Search
USPC ............................................................ 706/11
See application file for complete search history.

(56) References Cited

U.S. PATENT DOCUMENTS 8,108,422 B2 1/2012 Anderson et al.
10,175,979 B1 1/2019 Elwell
11,429,859 B2 8/2022 Lehr et al.
11,651,248 B2 5/2023 Marvaniya et al.
2007/0010940 A1* 1/2007 Tan ...................... G01C 21/165 701/469
2007/0015125 A1* 1/2007 Mobbs ..................... G09B 7/00 434/219
2012/0078804 A1* 3/2012 Scarborough ...... G06Q 10/1053 705/321
2012/0159389 A1 6/2012 Keith et al.
2014/0249500 A1* 9/2014 Estes ................. A61M 5/14244 604/151

(Continued)

FOREIGN PATENT DOCUMENTS

EP 4327229 2/2024
IN 202327075280 A 4/2024

OTHER PUBLICATIONS

Linguistic Models for Analyzing and Detecting Biased Language (Year: 2013).*

(Continued)

*Primary Examiner* — Omar F Fernandez Rivas
*Assistant Examiner* — Em N Trieu
(74) *Attorney, Agent, or Firm* — Jennifer Hayes; NIXON PEABODY LLP

(57) ABSTRACT

The present disclosure is directed towards artificial intelligence systems and methods for receiving and analyzing data. An exemplary method provides for receiving input, at an interface on a computing device. The input includes a dataset, an analysis for the dataset, and an output medium. The method then provides for selecting, based on the received input, at least one algorithm from a plurality of algorithms. The method then provides for processing, via the computing device, the received input with the at least one algorithm to yield an output. The output is provided at the interface on the computing device.

33 Claims, 16 Drawing Sheets

(56) References Cited

U.S. PATENT DOCUMENTS

| | | | | |
|---|---|---|---|---|
| 2014/0279771 | A1* | 9/2014 | Golovashkin ............ | G06N 3/04<br>706/16 |
| 2016/0303483 | A1* | 10/2016 | Snoddy .................. | G06N 3/006 |
| 2017/0006430 | A1* | 1/2017 | Chao ...................... | G06Q 10/06 |
| 2017/0053461 | A1* | 2/2017 | Pal ......................... | G08G 1/012 |
| 2017/0293858 | A1 | 10/2017 | Larsen | |
| 2018/0029293 | A1 | 2/2018 | Neibecker et al. | |
| 2018/0253735 | A1* | 9/2018 | Bedoun .................. | G06N 20/00 |
| 2019/0057356 | A1 | 2/2019 | Larsen | |
| 2019/0099653 | A1 | 4/2019 | Wanke | |
| 2019/0121855 | A1 | 4/2019 | Alexander et al. | |
| 2021/0027182 | A1* | 1/2021 | Harris .................... | G06N 20/20 |
| 2021/0240892 | A1 | 8/2021 | Meinders | |

OTHER PUBLICATIONS

Automated Experiments on Ad Privacy Settings A Tale of Opacity, Choice, and Discrimination (Year: 2015).*

Capsule Network Performance on Complex Data, herein after Xi (Year: 2017).*

Wekinator Software created in 2009 by Rebecca Fiebrink. Available at: www.wekinator.org.

Wekinator online publication regarding Wekinator Software. Available at: www.wekinator.org/instructions/.

Datta et al., Automated Experiments on Ad Privacy Settings—A Tale of Opacity, Choice and Discrimination, 2015, Proceedings on Privacy Enhancing Technologies, pp. 1-26.

Meinders, C., Embodying Artificial Knowing, Critical Practices: MFA Thesis (part 1), Media Design Practices, ArtCenter College of Design, 2017, 24 pages.

International Search Report and Written Opinion for PCT/US2022/024875 dated Aug. 16, 2022, 8 pages.

Meinders, C., et al., Participatory AI—How to Make Better AI?, 2021, Retrieved from the Internet: https://web.archive.org/web/20210305163332/https://share.hek.ch/en/participatory-ai-how-to-make-better-ai/ retrieved on Jan. 19, 2025.

EP 22792236.6 Extended European Search Report dated Feb. 7, 2025.

Mujtaba et al., Ethical Considerations in AI-Based Recruitment, IEEE International Symposium on Technology and Society (ISTAS), 2019, pp. 1-7.

* cited by examiner

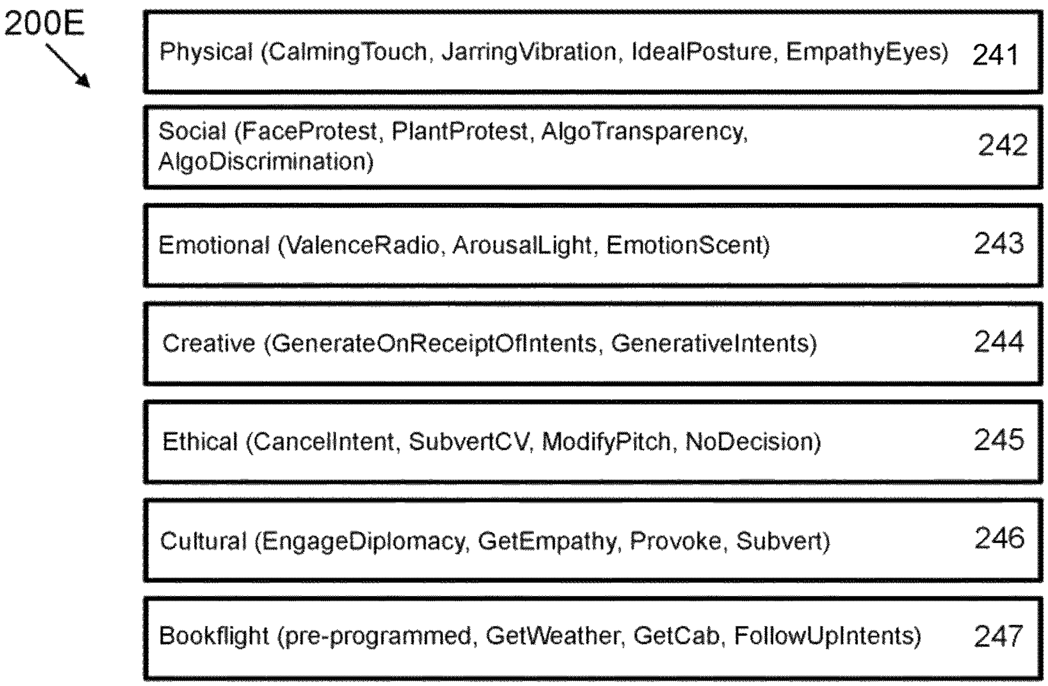

FIG. 2E

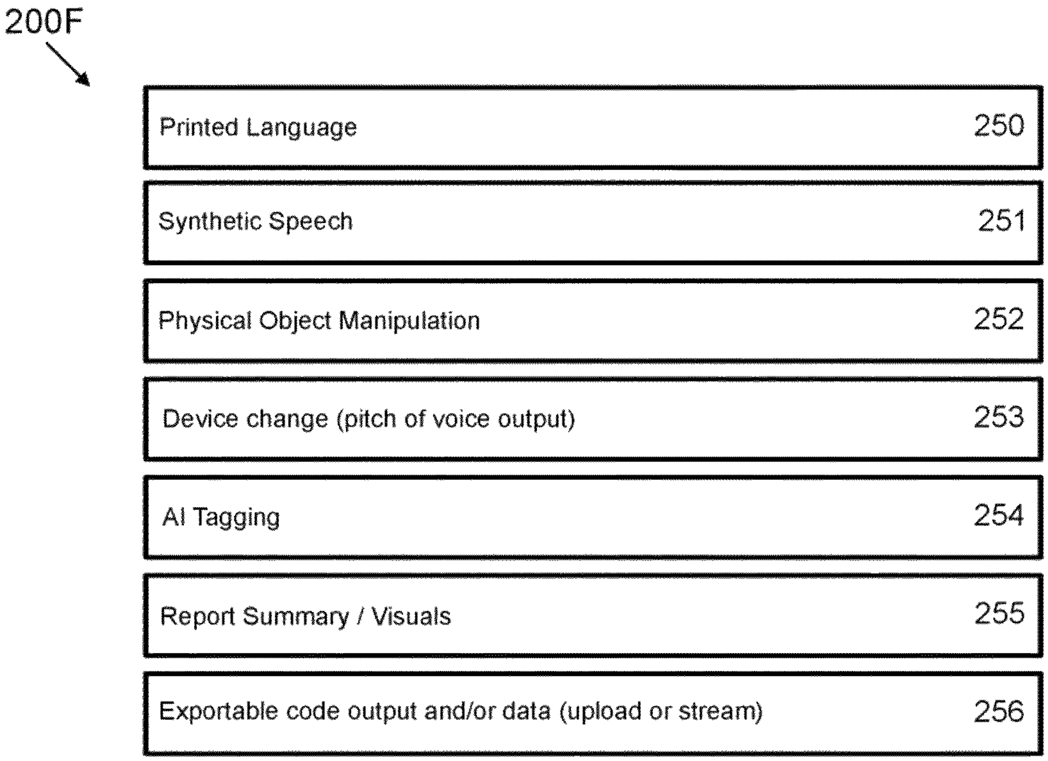

FIG. 2F

| | |
|---|---|
| Physical (CalmingTouch, JarringVibration, IdealPosture, EmpathyEyes) | 241 |
| Social (FaceProtest, PlantProtest, AlgoTransparency, AlgoDiscrimination) | 242 |
| Emotional (ValenceRadio, ArousalLight, EmotionScent) | 243 |
| Creative (GenerateOnReceiptOfIntents, GenerativeIntents) | 244 |
| Ethical (CancelIntent, SubvertCV, ModifyPitch, NoDecision) | 245 |
| Cultural (EngageDiplomacy, GetEmpathy, Provoke, Subvert) | 246 |
| Bookflight (pre-programmed, GetWeather, GetCab, FollowUpIntents) | 247 |

| | |
|---|---|
| Printed Language | 250 |
| Synthetic Speech | 251 |
| Physical Object Manipulation | 252 |
| Device change (pitch of voice output) | 253 |
| AI Tagging | 254 |
| Report Summary / Visuals | 255 |
| Exportable code output and/or data (upload or stream) | 256 |

400

410. Receive input comprising an artificial intelligence system.

420. Determine, via an artificial intelligence agent, whether metadata associated with the received input has a bias.

430. Identify a portion of the received input corresponding to the bias.

440. Display the identified portion and the bias.

800

| 802 MEDIA | 804 BEHAVIOR | 806 MATERIAL | 808 XR | 810 AI |
|---|---|---|---|---|
| Text | Throw | Phone | IRL | Data (Collection) + Model (Unsupervised learning) |
| Text, Audio, Video 3d Objects | Visio-Spatial Sort | Headsets/ Controllers | VR | Data (Sorting) |
| 3d Object in physical space | Placing and/or Receiving | Phone/Tablet | AR | Output for Individual Experience |
| | | Photon + Phone/Tablet | IoTAR | Output for Collective Experience |
| | | | | |

FIG. 8

TOOL FOR DESIGNING ARTIFICIAL INTELLIGENCE SYSTEMS

CROSS-REFERENCE TO RELATED APPLICATIONS

This application claims priority under 35 U.S.C. § 119 to U.S. Provisional Application No. 62/656,278, entitled, "Artificial Intelligent Design Tool," filed Apr. 11, 2018, the contents of which are incorporated herein by reference.

FIELD

The present invention is directed to artificial intelligence design tools.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The following description includes information that may be useful in understanding the present invention. It is not an admission that any of the information provided herein is prior art or relevant to the presently claimed invention, or that any publication specifically or implicitly referenced is prior art.

Conventional artificial intelligence (AI) systems often suffer from severe biases in how the systems are constructed. The systems are trained on datasets, and the datasets can have inherent limitations in the data provided. For example, conventional face recognition software protocols might be trained on primarily Caucasian faces and have trouble recognizing other races. In another example, conventional voice recognition systems (often seen in smart assistants) were predominantly trained with primarily male voices. These limitations of the datasets training the AI systems correspond to the creation of systems that cannot adequately 'scale' to a wide audience. Even if a user wanted to create a system which was exposed to a wider range of training data, conventional users typically lack the ability and resources to identify and use appropriate training data. Therefore, conventional AI systems become brittle when encountering more complicated, real world situations with unexpected circumstances. This is a detriment to the usage of an AI system as humans can adapt to these unexpected circumstances, but conventional AI systems struggle greatly with input that deviates from the standard input. These limitations of conventional datasets primarily go unidentified because AI systems are deployed without discussion of the data training the AI system.

Conventional AI systems also suffer from model biases, as the models typically incorporate tools and assessments from existing western diagnostics, systems, and frameworks in computer/machine vision, vocal intonation, and natural language processing. In a specific example, products that incorporate emotions detection draw largely on existing western mental health diagnostics, which have their own assumptions. These models for emotion detection favor a very specific perspective; additionally, these models often focus on "taking" emotional information from a user without their consent. No conventional methods exist for an AI system designer to broaden the models used or to restrict user data uploaded.

Therefore, a conventional AI system suffers from unnoticed algorithmic injustices related to the algorithms that are used to analyze the input data and the data used to train the algorithm.

SUMMARY

The various examples of the present disclosure are directed towards artificial intelligence methods for receiving and analyzing data. In a first embodiment of the present disclosure, a method provides for receiving input, at an interface on a computing device. The input includes a dataset, an analysis for the dataset, and an output medium. The method then provides for selecting, based on the received input, at least one algorithm from a plurality of algorithms. The method then provides for processing, via the computing device, the received input with the at least one algorithm to yield an output. The output is provided at the interface on the computing device.

In some examples, selecting at least one algorithm includes determining whether the received input corresponds to requirements associated with each algorithm in the plurality of algorithms. The method then provides for selecting algorithms of the plurality of algorithms, based on determining that the received input corresponds to requirements associated with the selected algorithms.

In some examples, the input includes a format for the output, a supplementary dataset, a type of the dataset, and/or input consideration variables.

In some examples, the at least one algorithm includes an artificial intelligence model. The artificial intelligence model can be selected from a plurality of artificial intelligence approaches, including: an artificial narrow intelligence approach, a non-symbolic artificial intelligence approach, a symbolic artificial intelligence approach, a hybrid symbolic and non-symbolic artificial intelligence approach, and a statistical artificial intelligence approach.

In some examples, the at least one algorithm includes a machine learning model. The machine learning model can be selected from a plurality of machine learning models, including: a decision tree, a Bayesian network, an artificial neural network, a support vector machine, a convolutional neural networks, and a capsule network. In some examples, the machine learning model was trained on the received input. In some examples, the machine learning model was trained, via the computing device, on a subset of a database of artificial intelligence systems. The subset can include artificial intelligence systems with datasets comprising metadata corresponding to metadata of the received dataset and/or the output medium.

In some examples, the output includes an indication of whether the at least one algorithm successfully processed the received input.

In some examples, the method includes additional steps. The additional steps can provide for determining, via the computing device, whether the output comprises at least one bias in a plurality of biases. For example, the present disclosure searches for an unwanted bias (a bias unwanted by the user). Based on determining that the output comprises the at least one bias, the method provides for identifying a portion of the received input which corresponds to the determined bias. The method then provides for displaying the identified portion of the received input at the interface on the computing device.

In some examples, the method provides for removing the identified portion (which includes the at least one bias) from the received input to yield updated input. The method then provides for retrieving, via the computing device, supplementary input data in a database of artificial intelligence systems. The supplementary input data corresponds to the identified portion of the received input and does not comprise the at least one bias. The method then provides for displaying the supplementary input data at the interface on the computing device.

In some examples, the method additionally provides for receiving a request, via the interface on the computing device, to process a second selection of input data. The second selection of input data includes the received input with the supplementary input data in place of the identified portion. The method then provides for processing, via the computing device, the second selection of input data with the at least one algorithm. This yields a second output. The method provides for displaying the second output at the interface on the computing device.

In some examples, the second-output can be a revision of the first output.

In some examples, identifying the portion of the received input corresponding to the determined bias includes processing metadata associated with each of the received input. The metadata can include AI tagging, or identification of biases in the plurality of biases corresponding to each of the received input.

In a second embodiment of the present disclosure, a method provides for receiving input, at an interface on a computing device. The input includes a dataset, an analysis for the dataset, an output medium, and/or a processed output. The processed output includes an artificial intelligence system based on the dataset, the analysis for the dataset, and the output medium. The method provides for determining, via the computing device, whether metadata associated with the received input comprises at least one bias in a plurality of biases. The method then provides for identifying a portion of the received input corresponding to the at least one bias. The method then provides for displaying, at the interface on the computing device, the identified portion and the at least one bias.

In some examples, the method provides for retrieving, via the computing device, supplementary input data from a database of artificial intelligence systems. The supplementary input data corresponds to the identified portion of the received input and does not comprise the at least one bias. The method then provides for displaying the supplementary input data at the interface on the computing device.

In some examples, the method provides for receiving a request, via the interface for the computing device, to process a second selection of input data. The second selection of input data includes the received input with the supplementary input data in place of the identified portion. The method then provides for processing, via the computing device, the second selection of input data to yield an output. The method then provides for displaying the output at the interface on the computing device.

A third embodiment of the present disclosure provides for a non-transitory computer-readable medium. The non-transitory computer-readable medium includes embedded computer-readable code. The code, when loaded on a computing device, causes the computing device to perform a series of steps. The steps include receiving input, at an interface on the computing device. The input includes a dataset, an analysis for the dataset, and/or an output medium. The steps then provide for selecting, based on the received input, at least one algorithm from a plurality of algorithms. The steps then provide for processing, via the computing device, the received input with the at least one algorithm to yield an output. The steps then provide for displaying the output at the interface on the computing device.

In some examples, the steps provide for determining, via the computing device, whether the output comprises at least one bias in a plurality of biases. The steps then provide for identifying a portion of the received input corresponding to the determined bias, based on determining that the output comprises at least one bias. The steps then provide for displaying the identified portion of the received input at the interface on the computing device.

In some examples, the steps provide for removing the identified portion from the received input to yield updated input. The steps then provide for retrieving, via the computing device, supplementary input data in a database of artificial intelligence systems. The supplementary input data corresponds to the identified portion of the received input and does not comprise the at least one bias. The steps then provide for displaying the supplementary input data at the interface on the computing device.

In some examples, the steps provide for receiving a request, via the interface on the computing device, to process a second selection of input data. The second selection of input data includes the received input with the supplementary input data in place of the identified portion. The steps then provide for processing, via the computing device, the second selection of input data with the at least one algorithm to yield a second output. The second output is displayed at the interface on the computing device.

In some examples, identifying the portion of the received input corresponding to the determined bias further includes processing metadata associated with each of the received input. The metadata includes identification of biases in the plurality of biases corresponding to each of the received input.

The present disclosure refers to various machine learning or artificial intelligence algorithms or models. Any machine learning or artificial intelligence algorithm, as known in the art, can be used to perform various steps of the present disclosure, as would be readily apparent to one skilled in the art.

In some examples, the at least one algorithm (discussed above) is created from a learning algorithm. The present disclosure uses "algorithms" and "models" interchangeably. The disclosed tool allows users to define the type of artificial intelligence or artificial life they are designing within. Conventionally, users only design with artificial narrow intelligence and artificial life, but the present disclosure provide examples of artificial narrow intelligence and artificial super intelligence to reference additional approaches to AI. The AI tool also includes symbolic, non-symbolic and statistical systems.

The present disclosure refers to various systems and medium. Any system and/or output medium can be used by the disclosed AI tool, as would be readily contemplated by one skilled in the art.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 2A-2G demonstrate exemplary input selections for an AI interface, according to various embodiments of the present disclosure.

FIG. 8 shows an exemplary comparison of how AI data specific to one medium is used in a variety of mediums, according to an embodiment of the present disclosure.

DETAILED DESCRIPTION

Figure 1:
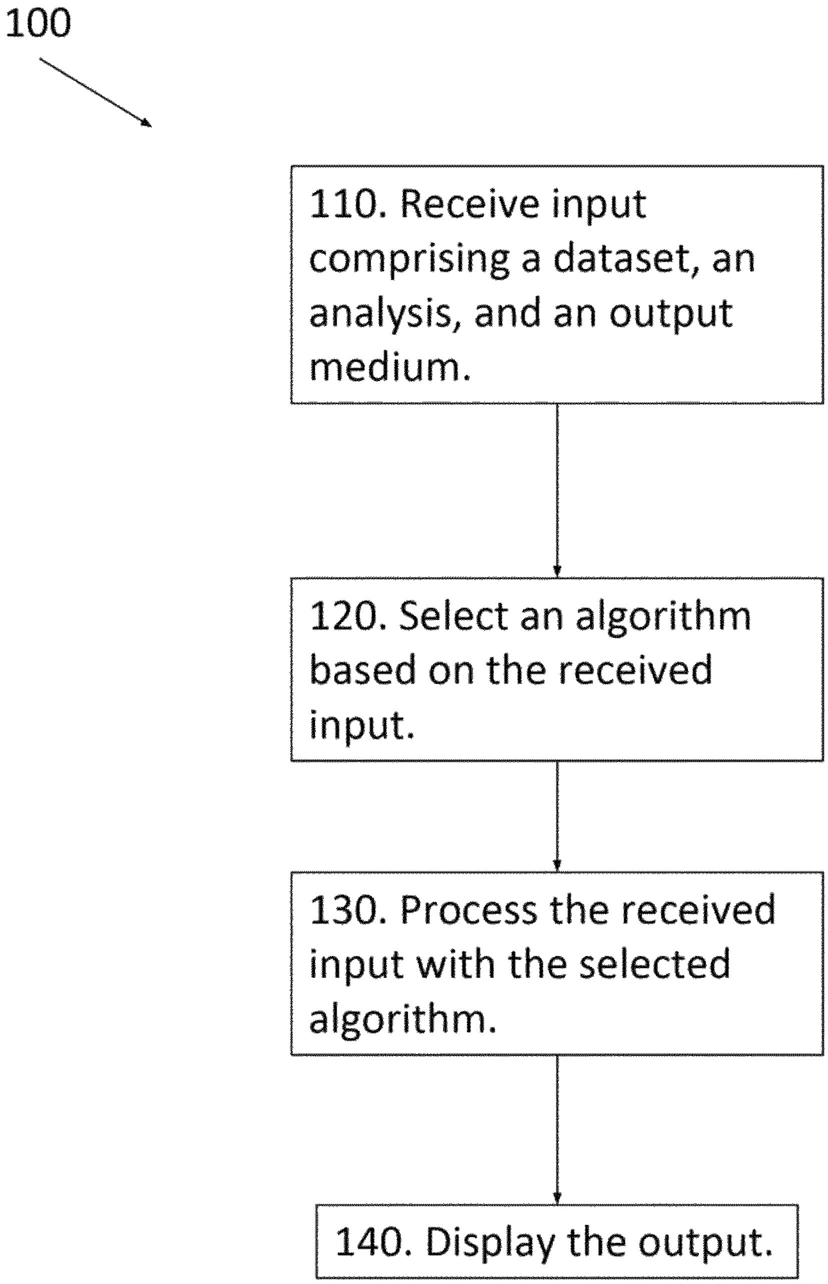
FIG. 1 shows an exemplary methodology for creating an AI system, according to an embodiment of the present disclosure.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Overview

AI systems, interfaces and experiences are becoming a foundational part of the re-search, design and development of products and experiences. The technical requirements of AI thinking can be challenging for those without programming experience. Therefore, the present disclosure provides an AI design tool for individuals to understand and engage in, not only the user experience of AI, but design for the systems and culture of AI. Additionally, this tool will use a deep learning architecture to find relationships from user-uploaded data.

The disclosed design tool provides a place for AI design thinking and creation that helps design teams, researchers, and developers start to make a space for inclusive AI design thinking. Accordingly, one embodiment of the present disclosure provides for an electronic tool for standardizing the AI design process; this tool helps users understand the different types and technical inputs for designing AI (algorithms, systems, agents, projects, experiences) and stresses the importance of culture and assumptions embedded in the design process.

This AI Design Tool helps designers, researchers, and developers build AI systems from technical and conceptual perspectives. The exemplary AI design tool provides for at least three modes, including (1) a design/prototyping mode, (2) a cultural probe mode, and (3) a playful exploration mode. The design/prototyping mode provides a technically accurate design, while still incorporating prompts for culture, bias and transparency. Some examples of the design/prototyping mode provide for localization and varying levels of connectivity, according to user preferences. The cultural probe mode looks at the cultural and social considerations/biases in AI systems that were already created (either by the AI design tool or by another, external system). The cultural probe mode therefore helps researchers identify bias in an existing system, remove unwanted or potential bias, and design further AI systems for transparency and opportunities for localization. The playful exploration mode allows users to build a new AI system that is primarily for learning purposes and does not need to include technically-perfect constructs.

Therefore, the disclosed AI design tool provides a variety of benefits to overcome the limitations of conventional AI systems. For example, the disclosed AI design tool can be used by users to learn about AI systems generally. In another example, the tool can identify and correct problematic assumption implicit in conventional AI products. In another example, the tool can provide ease of access to construct new AI systems without the biases of conventional systems.

Exemplary Methodologies and Systems

FIG. 1 shows a methodology 100 for creating an AI system using the disclosed AI design tool. The disclosed AI tool (in any embodiment of the present disclosure) can be an artificial intelligence tool or a computing device configured to perform artificial intelligence.

Methodology 100 begins at step 110 by receiving input. The input can be received at an interface for an artificial intelligence tool on a computing device (as discussed further with respect to FIG. 7). The input includes a dataset, an analysis for the dataset, and an output medium. In some examples, the input can include additional selections from a user related to the type of analysis, additional datasets, and acceptable output mediums (as discussed further with respect to FIGS. 2A-2H). In some examples, the input further includes a format for the output, a supplementary dataset, a type of the dataset, metadata corresponding to the dataset, and input consideration variables.

In some examples of step 110, a user "tags" the input dataset as including certain biases. For example, the user identifies the input dataset as being trained on only men, or only people of a particular race/ethnicity. In another example, the user identifies the analysis to be used on the database as created by only creators located in the Western Hemisphere.

In some examples of step 110, the tool prompts a user to choose whether to disclose or not disclose the uploaded data.

In some examples of step 110, the received input includes APIs, real time sensor information, existing data sets, or creating a new dataset.

At step 120, methodology 100 provides for selecting an algorithm and/or model based on the received input. In some examples, more than one algorithm can be selected. The algorithm can be selected from a plurality of algorithms stored at the artificial intelligence tool.

The methodology 100 can provide for any artificial intelligence approach, including an artificial narrow intelligence approach, an artificial general intelligence approach, an artificial intelligence super approach, a non-symbolic artificial intelligence approach, a symbolic artificial intelligence approach, a hybrid symbolic and non-symbolic artificial intelligence approach, a statistical artificial intelligence approach, and/or any other AI approach as known in the art.

For example, the machine learning model, as discussed further below, including any of: a decision tree, a Bayesian network, an artificial neural network, a support vector machine, a convolutional neural networks, and a capsule network.

In some examples, an algorithm provided by a selected machine learning model was trained on the received input. In some examples, the artificial intelligence tool comprises a database of pre-existing AI systems and datasets. The selected machine learning model was trained on a subset of these pre-existing AI systems and datasets, and can have been trained only on AI systems and datasets which have metadata corresponding to metadata of the input dataset and the output medium.

In some examples of step 120, the artificial intelligence tool determines whether the received input corresponds to requirements associated with each algorithm in the plurality of algorithms. For example, if the user wishes to build an AI system with a binary classifier as the output medium, the artificial intelligence tool will select a machine learning algorithm with a binary classifier. The artificial intelligence tool can verify that the dataset can be classified as a binary output.

Some examples of step 120 further include pre-processing the data. For example, the artificial intelligence tool identifies variables in the input dataset; these variables can correspond to variables that will be used by the selected algorithm.

In some examples of step 120, the algorithm is selected by an artificial intelligence process, as would be readily contemplated by one skilled in the art.

At step 130, methodology 100 provides for processing the received input with the selected algorithm. This yields an output. The output can be an AI system which is displayable on the output medium and is trained by the input dataset. In some examples of step 130, methodology 100 additionally provides an indication of whether the selected algorithm successfully processed the received input.

At step 140, methodology 140 provides for displaying the output. For example, the output can be displayed in the output medium. The output can be an AI system. The output medium can be any of the output formats discussed below with respect to screen 200F of FIG. 2F or screen 900C of FIG. 9C.

In some examples of step 140, the output is provided, and not displayed. For example, the system can provide for haptic feedback, tactile output, and/or auditory output. Any other sensory output or XR output can also be provided for by the AI tool. In some examples of step 140, the output is experience in real life, augmented reality, virtual reality, or any other emerging reality.

FIGS. 2A-2H demonstrate exemplary input selections for an AI interface, according to various embodiments of the present disclosure.

Figure 2A:
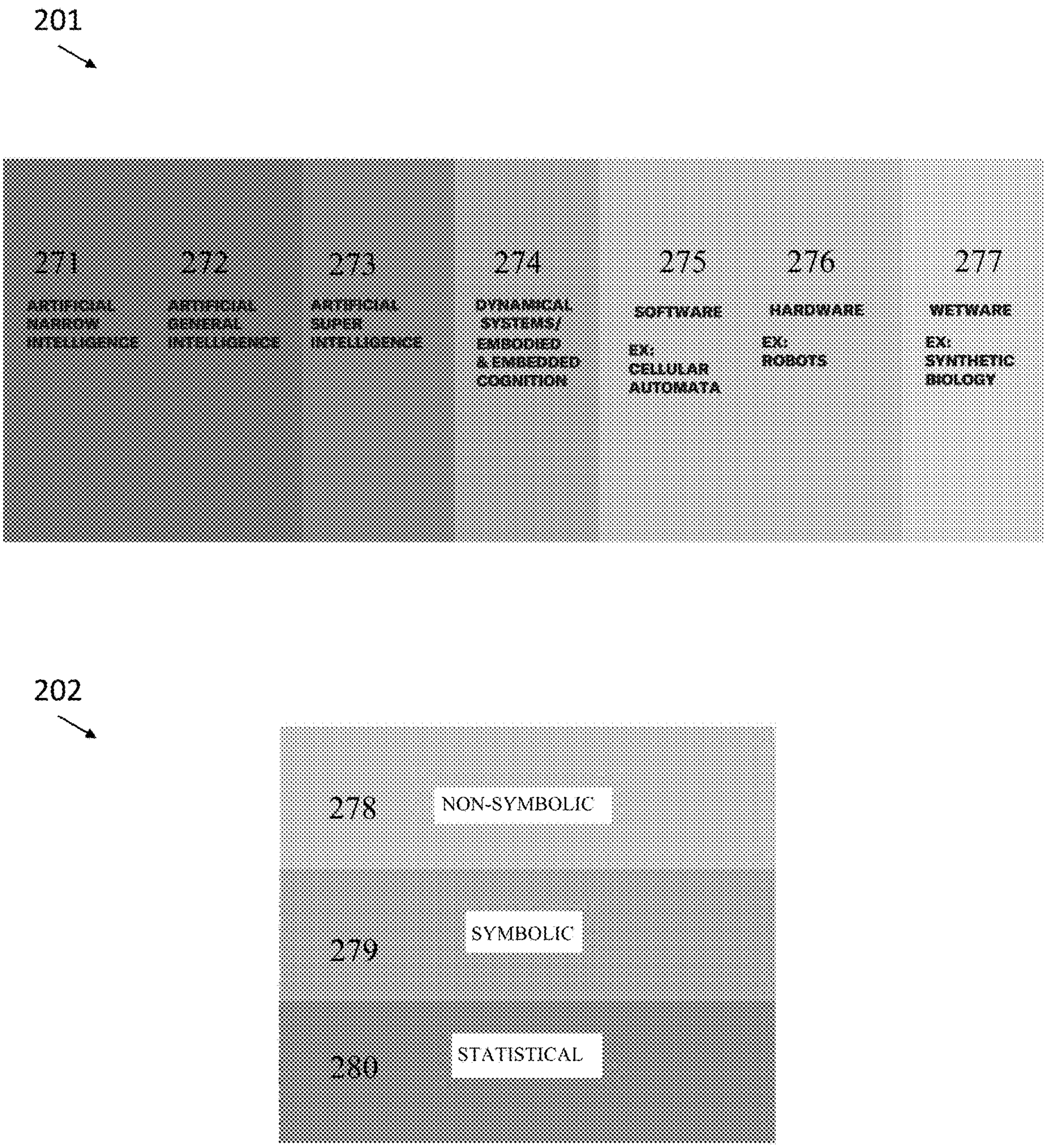

FIG. 2A shows an interface selection screen 201 and screen 202. Screen 201 prompts a user to select between an artificial narrow intelligence 271, an artificial general intelligence 272, an artificial super intelligence 273, a dynamical systems/embodied and embedded cognition 274, a software (e.g., cellular automata) 275, a hardware 276 (e.g., robots), and a wetware 277 (e.g., synthetic biology). If a user chooses artificial narrow intelligence 271, they are prompted to go to screen 202. In screen 202, a user can be prompted to select a symbolic, a non-symbolic, or a statistical AI. The selection options of FIG. 2A enable a user to tailor the AI system that the disclosed artificial intelligence tool will build according to design needs of the user.

Figure 2B:
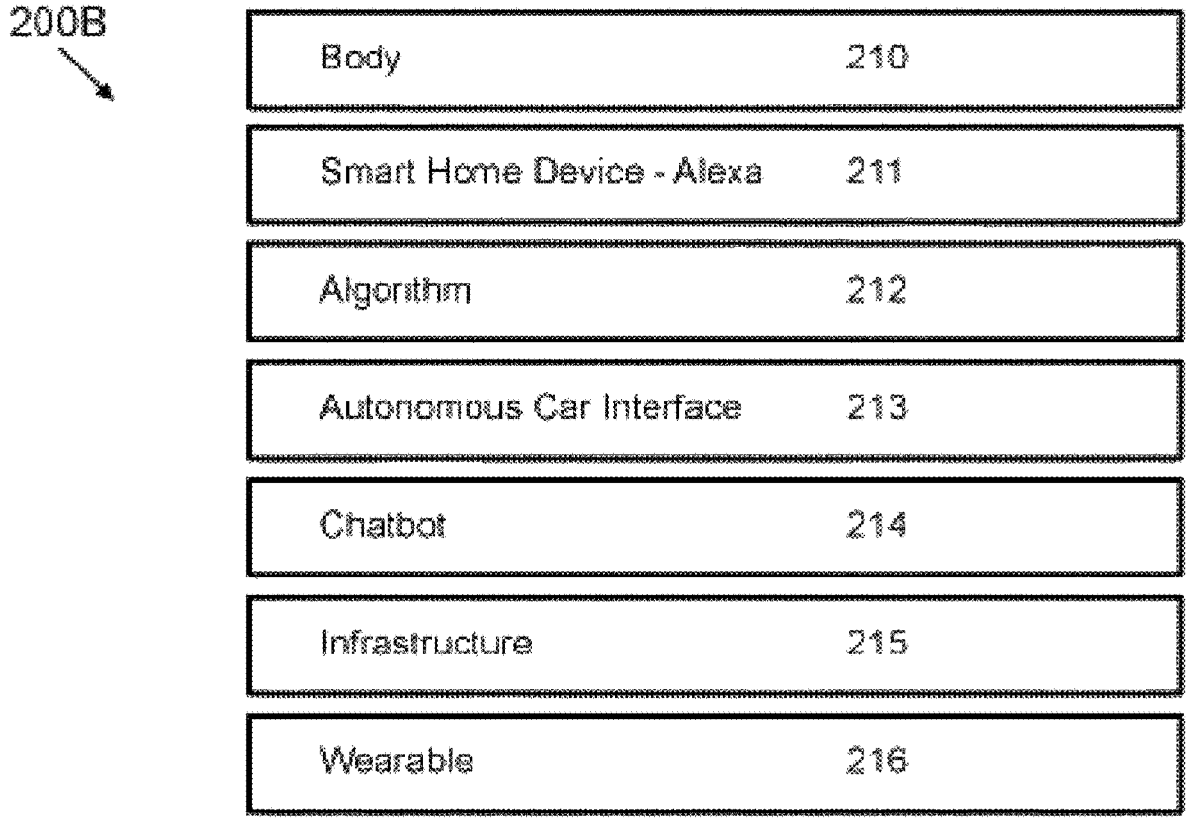

FIG. 2B shows an interface selection screen 200B which prompts the user to select an existing application, algorithm or hardware device. For example, a user chooses one of: a body 210, a smart home device (e.g., Alexa) 211, an algorithm 212, an autonomous car interface 212, a chatbot 214, an infrastructure 215, and a wearable 216. Therefore, the disclosed AI design tool provides an interface to integrate with, and modify, existing AI materials. Although a select number of existing AI materials are shown in screen 200B, the present disclosure contemplates any existing AI material, as known in the art, can be included on an exemplary screen 200B.

Figure 2C:
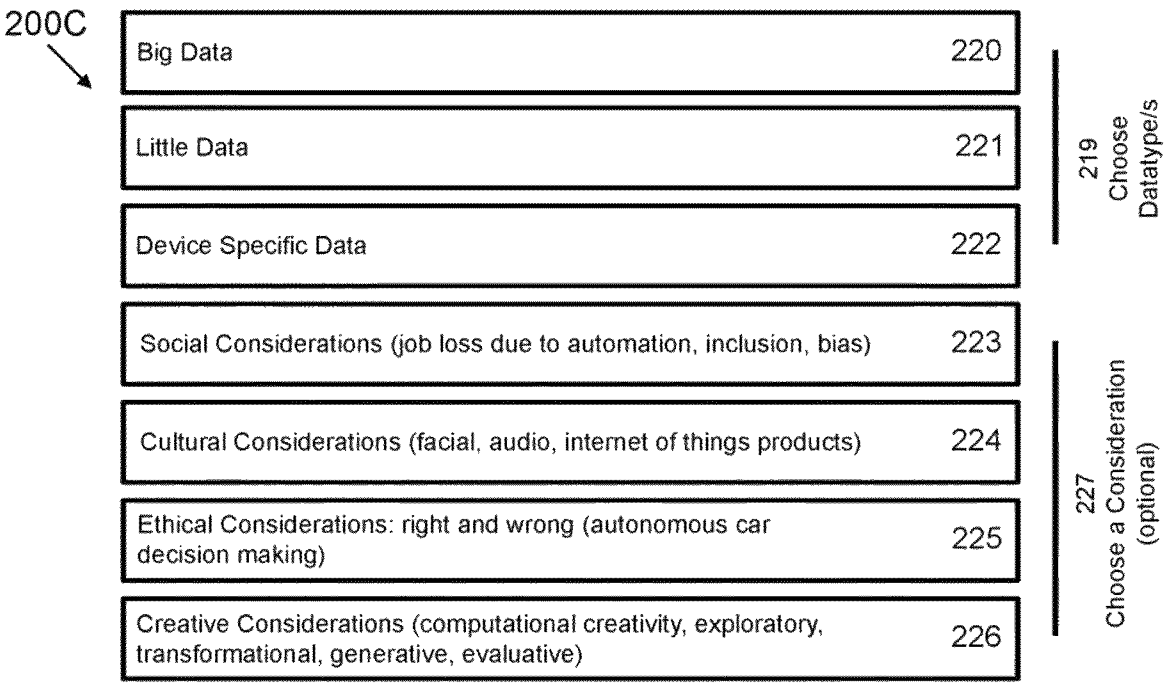

FIG. 2C shows an interface selection screen 200C which prompts the user to select an input. For example, the input can be a dataset 219 (e.g., big data 220, little data 221, or device specific data 222) and a consideration 227 (e.g., a social consideration 223, a cultural consideration 224, an ethical consideration 225, or a creative consideration 226). Social considerations 223 include, for example, job loss probability of an industry due to automation of a task, inclusion of a particular societal group or demographic, and bias towards or against a particular societal group or demographic. Cultural considerations 224 include, for example, facial/expression data, audio data, and internet of things products. Cultural considerations further include determining how emotion and feelings vary across cultures (or how various social preferences are location and cultural specific). Ethical considerations 225 include any determinations that must be made on a right or wrong (e.g., binary) basis. For example, ethical considerations 225 should be used for designing an AI system that produces autonomous car decision making. Creative considerations 226 include the user's desire for computational creativity, exploratory learning of AI development, a user's intention to transform particular data, a generational criterion, or an evaluative criterion.

Therefore, selection screen 200C provides a variety of datatype and potential considerations to choose from when a user is building an AI system. Upon receiving datatype(s) and a consideration, the artificial intelligence tool can eventually evaluate whether the final, created AI system achieves the selected consideration 227.

Figure 2D:
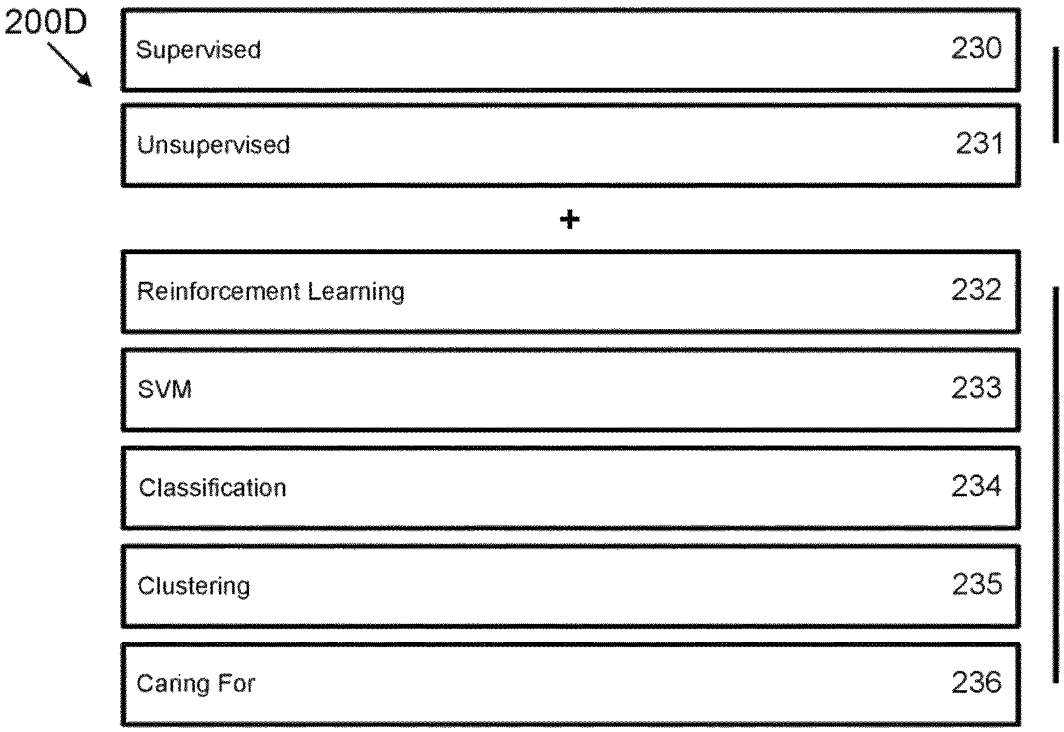

FIG. 2D shows an interface selection screen 200D which prompts the user to select a type of learning algorithm. For example, learning algorithm can be a supervised algorithm 230 or an unsupervised algorithm 231. The user makes a second selection, including reinforcement learning 232, a support vector machine 233, a classifier 234, a clustering technique 235, and a caring-for algorithm 236.

An exemplary caring-for algorithm 236 provides automated plant watering (e.g., ensuring that the plant had the correct nutrients in the soil, was watered routinely and with the right amount.) Additional caring-for algorithms 236 can be provided for personnel or other system tasks.

FIG. 2E shows an interface selection screen 200E which prompts a user to select an intent for the AI system. For example, the intent can be a physical intent 241, a social intent 242, an emotional intent 243, a creative intent 244, an ethical intent 245, a cultural intent 246, or a personal assistant intent 247.

A physical intent 241 corresponds to an AI system which is configured to provide some physical response to a user. For example, a physical response can include haptic feedback such as a jarring vibration and an emoji visual.

A social intent 242 corresponds to an AI system which is configured to facilitate political or socio-political activism. For example, an exemplary AI system with a social intent can facilitate participation in political rallies.

An emotional intent 243 can correspond to an AI system which is responsive to a user's emotions. Emotional intent 243 can be problematic if a user does not know who designed the emotions database and model, and from which cultural perspective; additionally, a user can prefer to opt in or consent to the utilization of an emotionally responsive AI. For example, an exemplary AI system with an emotional intent 243 provides sounds according to a user's mood, light changes according to a user's mood, and scent generation based on a user's mood.

A creative intent 244 corresponds to an AI system which does not need to correspond directly to algorithm accuracy, and can be used for user learning.

An ethical intent 24 corresponds to an AI system which must take into account ethical considerations.

A cultural intent 246 corresponds to an AI system which must take into account cultural norms of different societal groups.

A smart assistant intent 247 corresponds to an AI system which is configured to provide assistant to a user. For example, an AI system with a smart assistant intent 247 assists a user with travel arrangements (e.g. booking flights, seeing the weaver, booking a cab).

FIG. 2F shows an interface selection screen 200F with exemplary output formats. For example, the output formats can include printed language 250, synthetic speech 251, physical object manipulation 252, a device change 253, AI tagging 254, a report summary 255, and exportable code output or data production 256.

Interface selection screen 200F prompts a selection of a specific material/form for the construct AI system. Printed language 250 can include modifying language, or producing culturally/socially specific language. Synthetic speech 251 can include when users communicate or the system communicates (e.g. a synthetic speech system). In some examples, synthetic speech 251 modifies how language is personalized to users, in a transparent way. For example, a user can opt in to choosing specific type of speech. or producing culturally/socially specific language. Physical object manipulation 252 can include manipulating objects in the real or virtual worlds. Device change 253 can include pitch changing software. AI tagging 254 can include tagging input data, output data, or a model. Exportable code output or data production 256 can include an existing product that the user may export or link out to alternative databases or models.

Figure 2G:
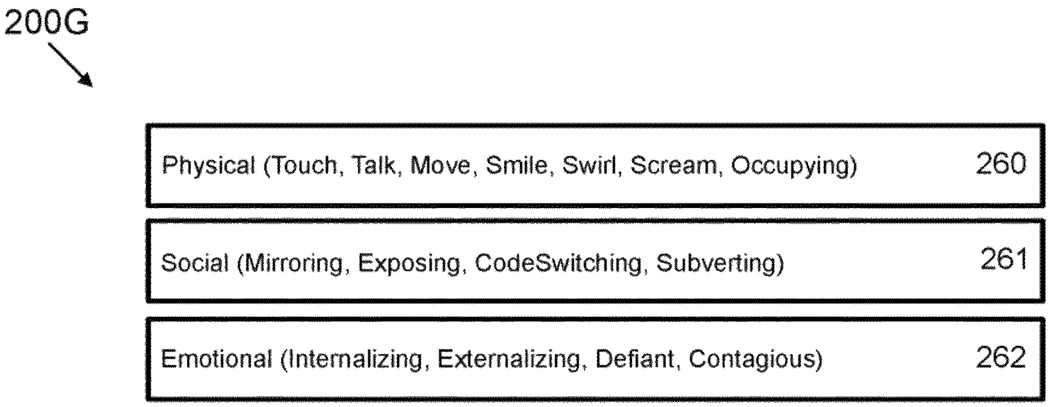

FIG. 2G shows an interface selection screen 200G with exemplary behaviors. For example, interface selection screen 200G corresponds to a sociocultural design tool. Exemplary behaviors include, for example, physical behaviors 260, social behaviors 261, and emotional behaviors 262. A physical behavior 260 corresponds to an AI system which is configured to provide physical feedback to a user. The physical behavior 260 of the AI system can include, for example, physical touch, talking, movement of devices controlled by the AI system, and smiling emojis. A social behavior 261 corresponds to an AI system which is configured to provide social feedback to a user. The social behavior 261 of the AI system can include, for example, mirroring a user's behavior, identifying particular aspects of a user's behavior, or subverting particular actions of a user. An emotional behavior 262 corresponds to an AI system which is configured to provide emotional feedback to a user. The emotional behavior 262 of the AI system can include, for example, identifying that a user is internalizing certain feelings, that a user is externalizing certain feelings, and that a user is acting defiant.

In some examples of the disclosed AI design tool, a user can make more than one selections on any of screens 200A-200G. Although particular options are shown in each of screens 200A-200G, the present disclosure contemplates each of the screens 200A-200G can include any selections as known in the art.

In other examples of FIGS. 2A-2G, an exemplary interface screen provides a text box. A user can enter text related to a prompt; the disclosed tool can analyze the text with any algorithm discussed herein to provide additional learning for the disclosed tool or additional data for any aspect of the disclosed tool.

In other examples of the disclosed AI design tool, the artificial intelligence tool prompts the user for particular selections based on the user's previous input. For example, if the user makes selections in accordance with building an interface for Alexa, the artificial intelligence tool prompts the user to choose social considerations 223 on FIG. 2C and emotional intent on FIG. 2E.

In some examples, the artificial intelligence tool collects usage data of user selections on screens 200A-200G over a plurality of usage instances. The artificial intelligence tool learns patterns of the user according to the user selections (learning, for example, via a machine learning model as discussed further below). The artificial intelligence tool thereby identifies inherent biases of the user according to the user selections. The artificial intelligence tool can then prompt the user on the various screens 200A-200G.

Figure 3:
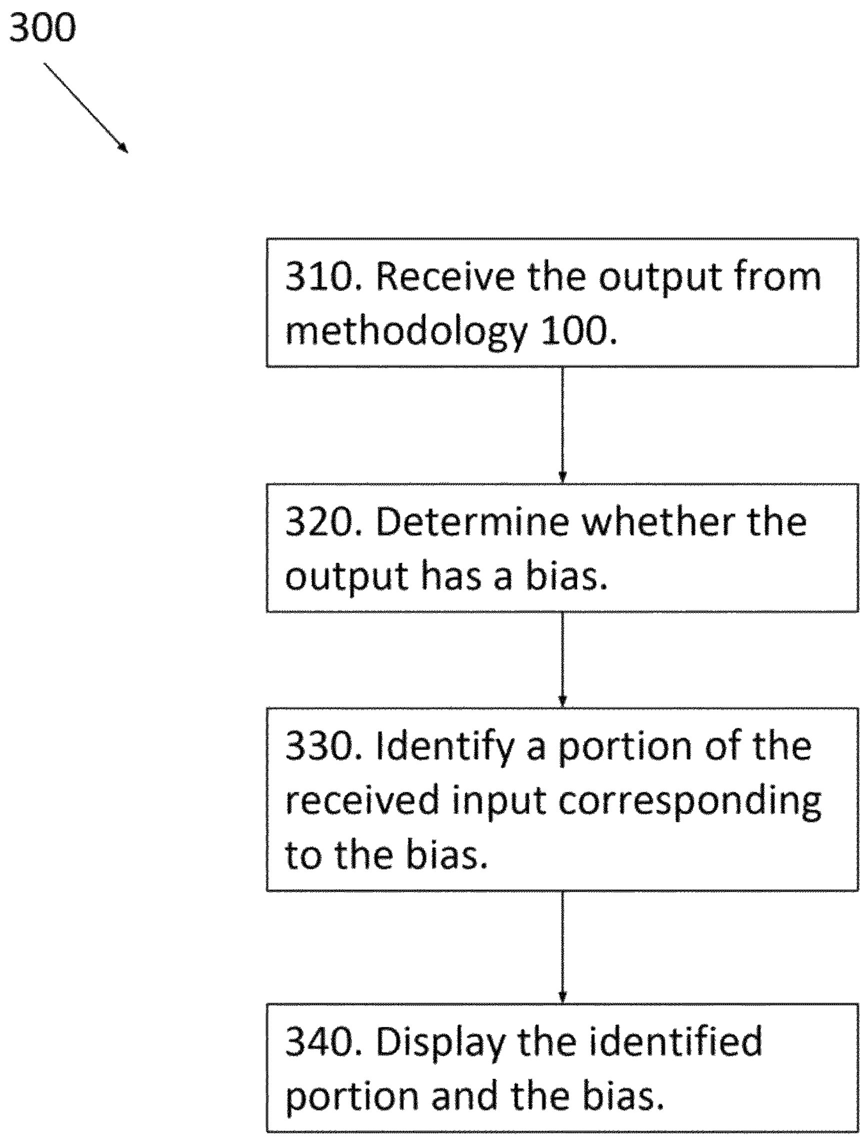
FIG. 3 shows an exemplary methodology for identifying a bias in a created AI system, according to an embodiment of the present disclosure.

FIG. 3 shows an exemplary methodology 300 for identifying a bias in a created AI system. For example, the created AI system can be the output displayed at step 140 of FIG. 1. Methodology 300 begins at step 310 by receiving an output.

At step 320, methodology 300 provides for determining whether the output has a bias. For example, the artificial intelligence tool can search for any bias in a plurality of biases (e.g., social biases, cultural biases, gender biases, racial biases, and interaction biases created through usage over time). In some examples of step 320, the artificial intelligence tool retrieves metadata or tagging of the input dataset to determine whether there are inherent limitations of the input dataset (e.g., was the dataset trained on only people of a particular race, gender, world-view, geography, or any other limitation as known in the art).

In some examples of step 320, the methodology 300 searches only for an unwanted bias. For example, the user can select biases that the artificial intelligence tool should identify. In other examples, the methodology 300 provides for suggesting what bias is likely, even if no bias is identified.

If a bias is not identified at step 320, methodology 300 can provide for displaying, at step 340, that no bias was identified.

If a bias is identified at step 320, methodology 300 proceeds to step 330 and identifies a portions of the received input corresponding to the bias. In some examples of step 330, the artificial intelligence tool can provide for processing metadata associated with each of the received input. The metadata can include identification of biases corresponding to each of the received input. Step 330 can identify the portion of the input dataset which has the bias identified at step 320.

At step 340, methodology 300 provides for displaying the identified portion and the bias. For example, the identified portion and the bias can be displayed at an interface display at a user's computing device.

Figure 4:
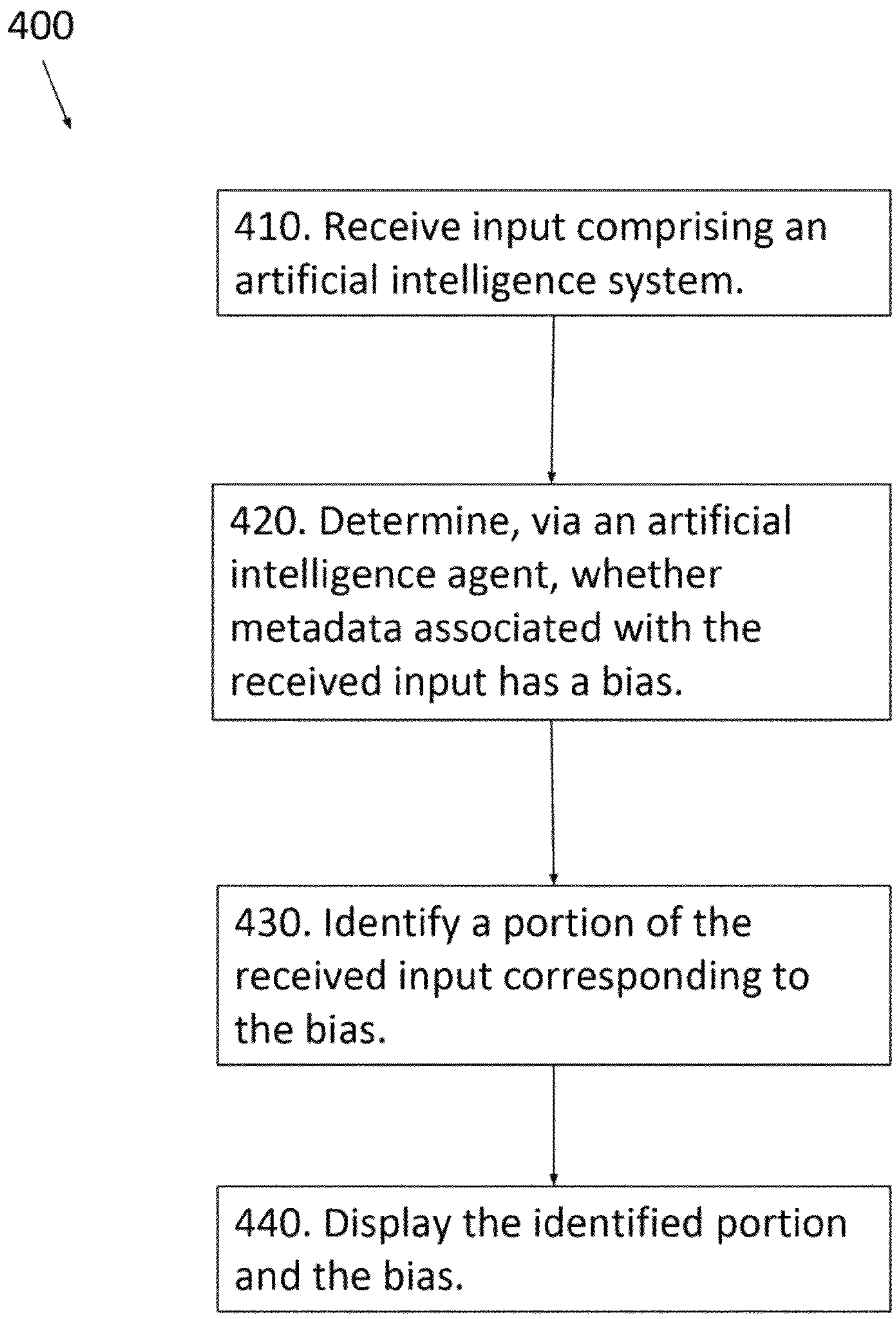
FIG. 4 shows an exemplary methodology for identifying a bias in an externally created AI system, according to an embodiment of the present disclosure.

FIG. 4 shows an exemplary methodology 400 for identifying a bias in an externally created AI system. Methodology 400 receives an artificial intelligence system as the input dataset at 410. Step 410 can additionally, or alternatively, receive a dataset, an analysis for the dataset, an output medium, an algorithm/model, and a processed output. The processed output can be an artificial intelligence system based on the dataset, the analysis for the dataset, and the output medium.

At step 420, methodology 400 provides for determining, via the disclosed artificial intelligence tool, whether metadata associated with the received input from step 410 has a bias.

Methodology 400 provides similar bias identification and display (steps 430 and 44) as steps 330 and 340 of methodology 300 of FIG. 3. Therefore, methodology 400 provides a method for analyzing existing artificial intelligence systems and identifying whether the existing system contains hidden limitations or biases. The disclosed AI tool provides for deconstructing problematic approaches to the design and development of conventional AI systems, while designing for new knowledge systems.

Figure 5:
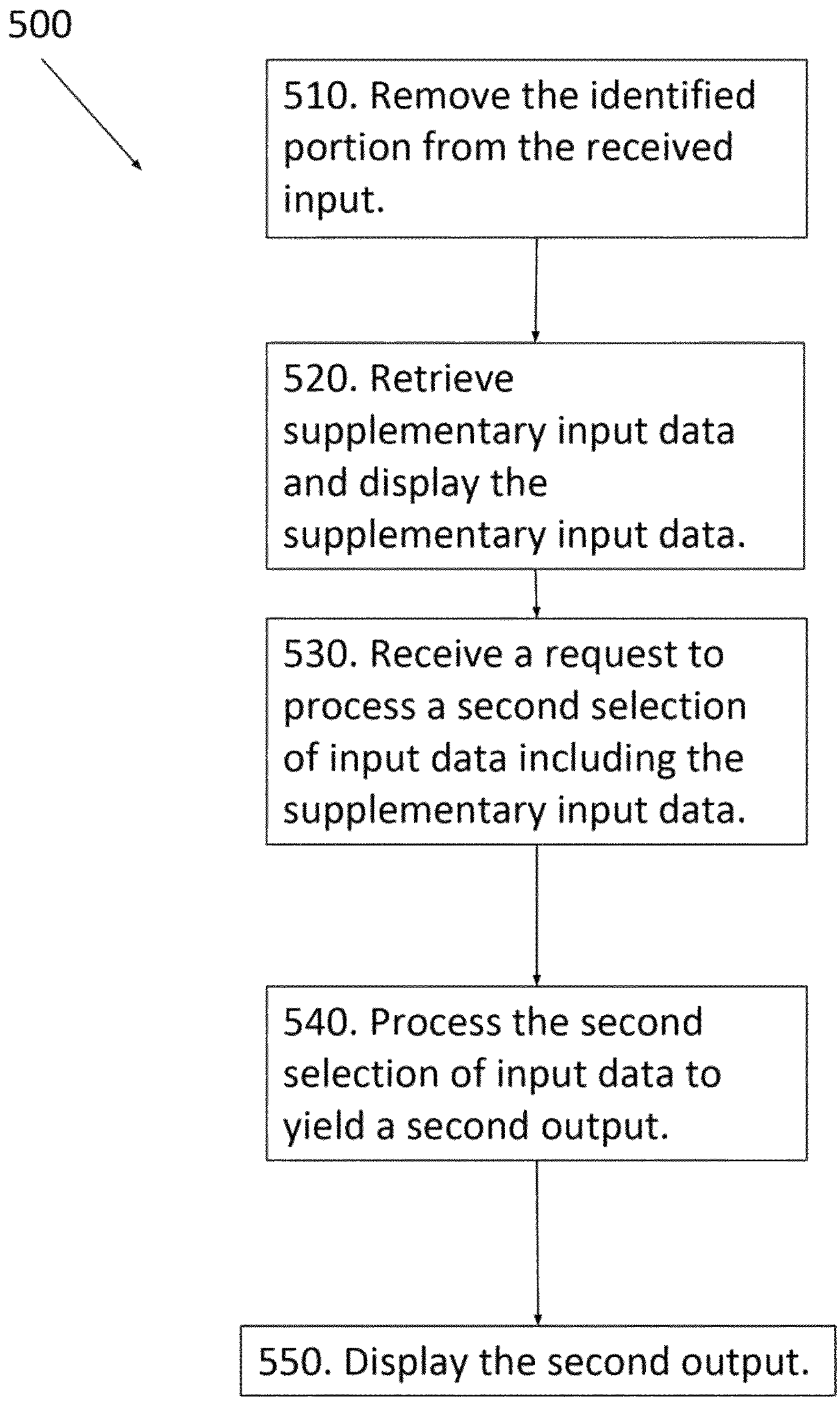
FIG. 5 shows an exemplary methodology for removing a bias in a created AI system, according to an embodiment of the present disclosure.

FIG. 5 shows an exemplary methodology 500 for removing an unwanted bias in a created AI system. Methodology 500 begins at step 510 with removing an identified portion from a received input. For example, the disclosed tool can provide for removing a portion of the data from the received input corresponding to an unwanted bias. The identified portion can be identified according to steps 330 and 430 of FIGS. 3 and 4, respectively.

Methodology 500 then proceeds to step 520 which provides for retrieving supplementary input data. The supplementary input data can be any of the input data discussed above with respect to step 110 of FIG. 1. In some examples of step 520, the disclosed tool can retrieve supplementary input data from a database of AI systems. The supplementary input data corresponds to the identified portion of the received input and does not include the selected bias.

In an example of steps 510 and 520, the disclosed tool identifies that a facial recognition AI system comprises a dataset of Caucasian faces with little other racial diversity. Therefore, the disclosed tool retrieves a dataset of faces comprising a greater amount of racial diversity. In another example, the disclosed tool retrieves an AI facial recognition system, which was trained on a dataset of faces with greater levels of racial diversity than the original AI facial recognition system.

Methodology 500 then proceeds to step 530 which provides for receiving a request to process a second selection of input data including the supplementary input data (retrieved at step 520). For example, the user can select the supplementary input data at a user interface (for example, the interface screens as discussed with respect to FIGS. 2A-2G).

Methodology 500 can then proceed to process the second selection of input data to yield a second output (step 540) and display the second output (step 550). Steps 540 and 550 of methodology 500 can correspond to steps 130 and 140 of methodology 100, as discussed above with respect to FIG. 1.

Therefore, FIG. 5 shows an exemplary methodology 500 which provides for minimizing biases in created AI systems.

In an exemplary implementation according to the disclosed methodologies, the disclosed design tool identifies that an artificial intelligence voice recognition system was trained by white male voices (and no other types of voices). Such an artificial intelligence voice recognition system might prioritize enunciation, choose a loud voice over a soft voice, etc. The disclosed design tool can identify and provide these biases to a user. In some examples, the disclosed design tool can suggest adjustments to the artificial intelligence voice recognition system; for example, adjusting the data set to include women, or artificially decreasing the volume and modifying the enunciation.

In another exemplary implementation according to the disclosed methodology, a user can use a neural network to analyze a dataset via the disclosed AI tool. The user then switches to a classification algorithm. The tool can provide for displaying the output from the neural network compared against the output from the classification algorithm. In some examples, the tool can identify the changes and determine which algorithm provided a more accurate output.

Figure 7:
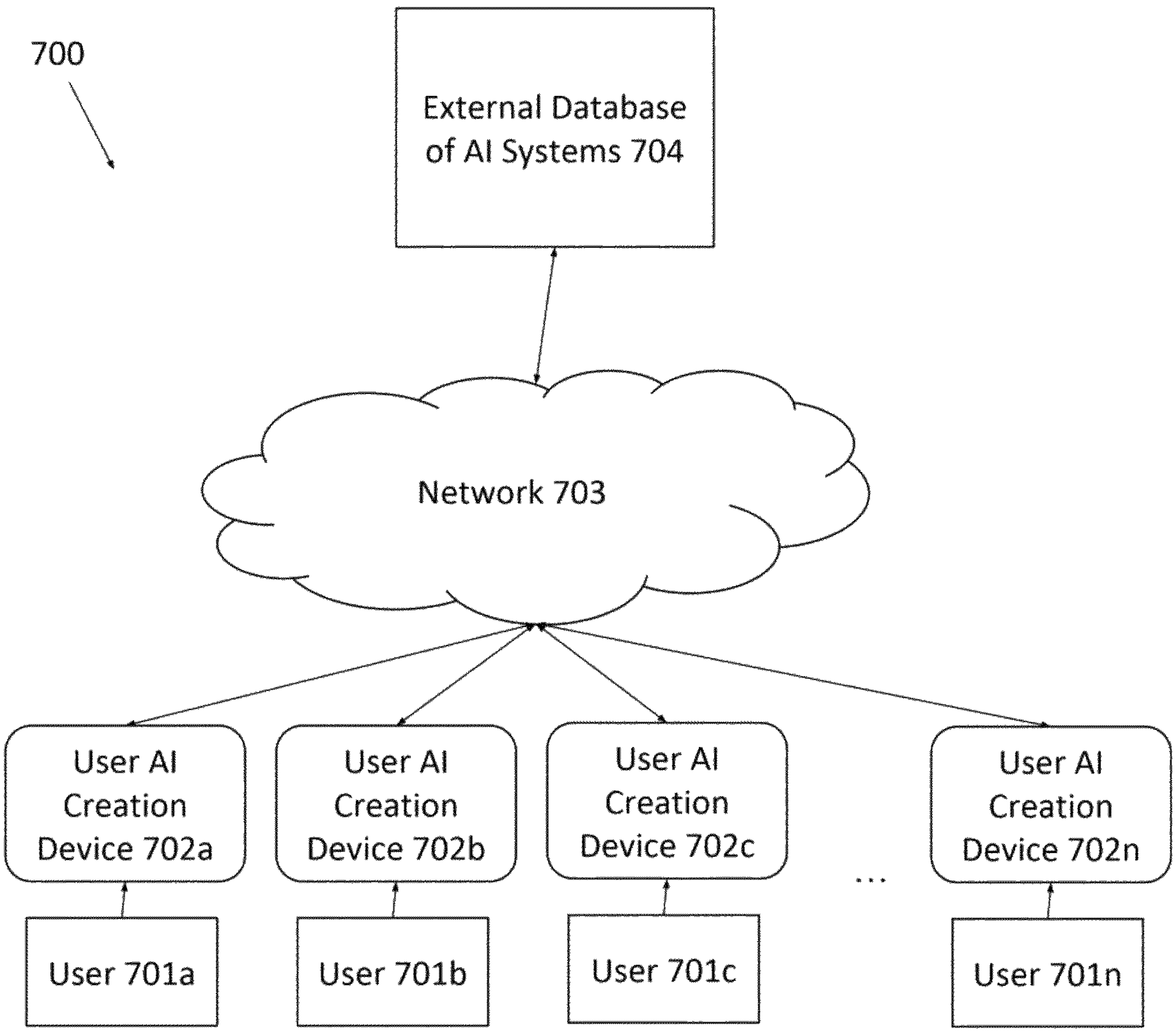
FIG. 7 shows an exemplary system for building and/or evaluating an AI system, according to an embodiment of the present disclosure.

Referring now to FIG. 7, the present disclosure provides a system 700. System 700 includes a plurality of users 701*a*, 701*b*, 701*c* . . . 701*n*; a plurality of user AI creation devices 702*a*, 702*b*, 702*c* . . . 701*n*; a network 703; and an external database 704. The plurality of users 701*a*, 701*b*, 701*c* . . . 701*n* each have an associated user AI creation devices 702*a*, 702*b*, 702*c* . . . 701*n*. The user AI creation devices 702*a*, 702*b*, 702*c* . . . 701*n* can include a software application running the disclosed AI tool, according to any of the embodiments discussed herein. In some examples, as shown in FIG. 7, the users 701*a*, 701*b*, 701*c* . . . 701*n* are connected to a network 703. By the network 703, the external computing device can facilitate information exchange between the plurality of user AI creation devices 702*a*, 702*b*, 702*c* . . . 701*n* and the users 701*a*, 701*b*, 701*c* . . . 701*n*. For example, when user 701*a* uploads a new database, any other of the users 701*b*, 701*c* . . . 701*n* can access the database via the network 703. In some examples, the database is uploaded to the external computing device 704.

In other examples of FIG. 7 (not shown), the users 701*a*, 701*b*, 701*c* . . . 701*n* can choose for their associated user AI creation devices 702*a*, 702*b*, 702*c* . . . 701*n* to be disconnected from the network 703.

In other examples of FIG. 7, the users 701*a*, 701*b*, 701*c* . . . 701*n* selectively choose which information/data is shared by their associated user AI creation devices 702*a*, 702*b*, 702*c* . . . 701*n* with the network 703.

Referring now to FIG. 9, additional interface screens are shown for an exemplary embodiment of the disclosed AI tool. For example, in screen 900A, the disclosed AI tool prompts the user to select profile info 902; smart home and/or internet of things product inputs 904; emotions analysis 906; little data 908; touch 910; and mapping data 912. In screen 900B, the disclosed AI tool prompts the user to select an analysis algorithm, including any of a swarm theory 914, a sorting algorithm 916, a neural network 918, a searching algorithm 920, a watching algorithm 922, and a linear regression analysis 924. In screen 900C, the disclosed AI tool prompts the user to select an output. The output can include any system or medium that the user intends to interact with the product provided by the AI tool. For example, screen 900C shows an autonomous car 926, a surveillance camera 928, an art generation product 930, an ocean product 932, an algorithm 934, a music generator 936, a digital profile or wearable device 938, a plant growth model 940, a fraud detection product 942, a chatbot or robot 944, a quilting design product 946, and an artificial intelligence healthcare product 948.

Figure 9A:
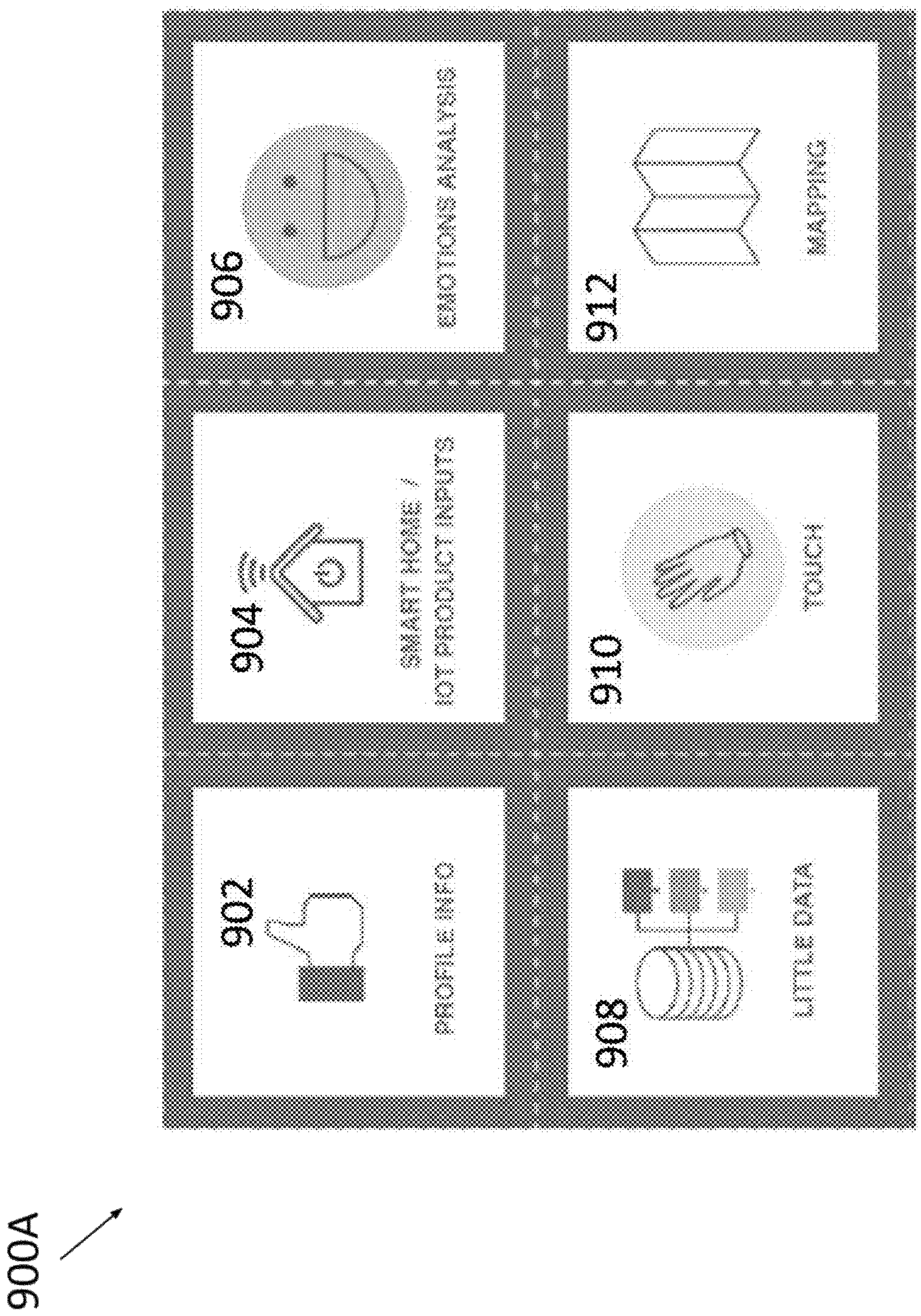
FIGS. 9A-9C show exemplary input selections in an AI interface, according to an embodiment of the present disclosure.
Figure 9B:
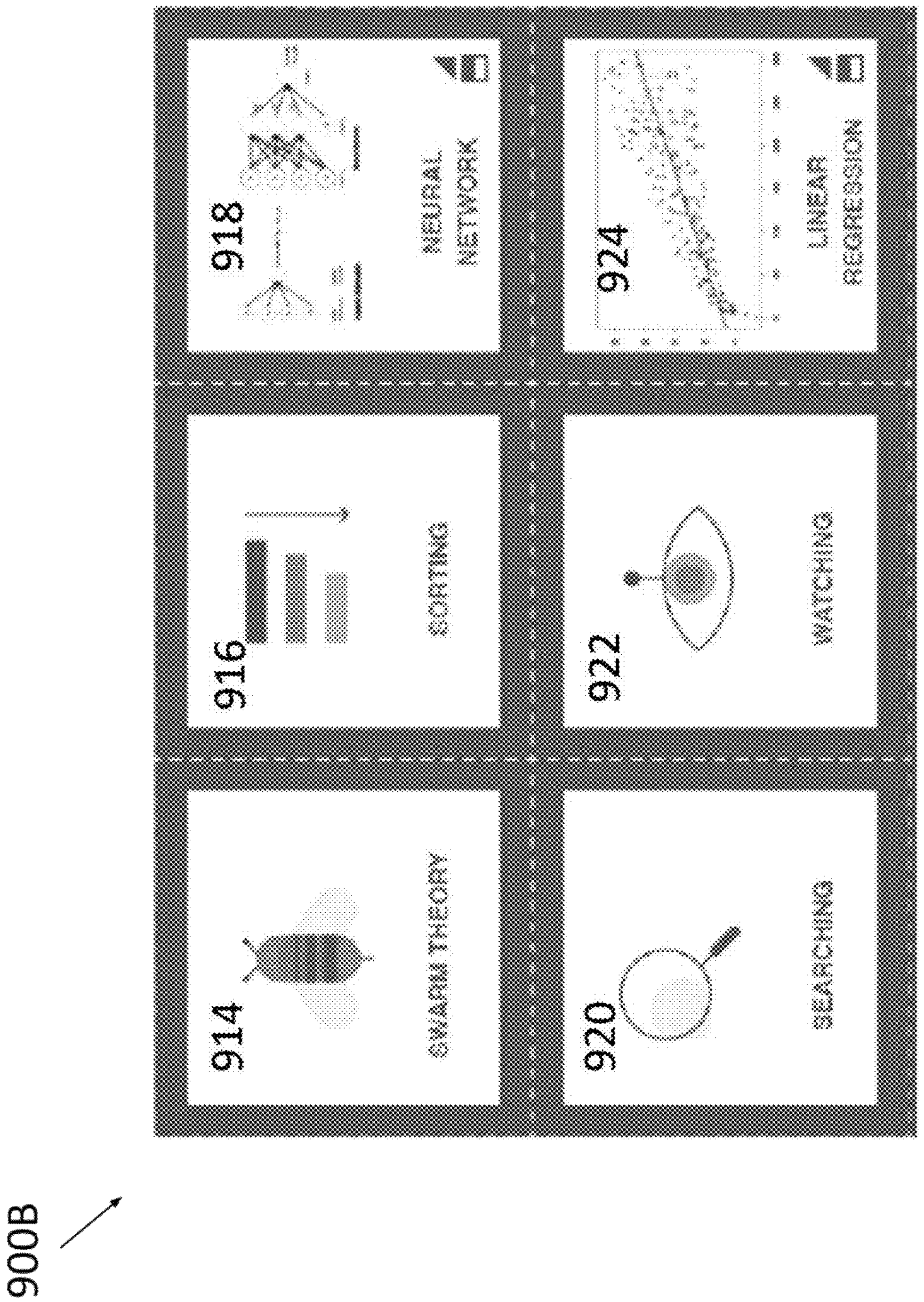
Figure 9C:
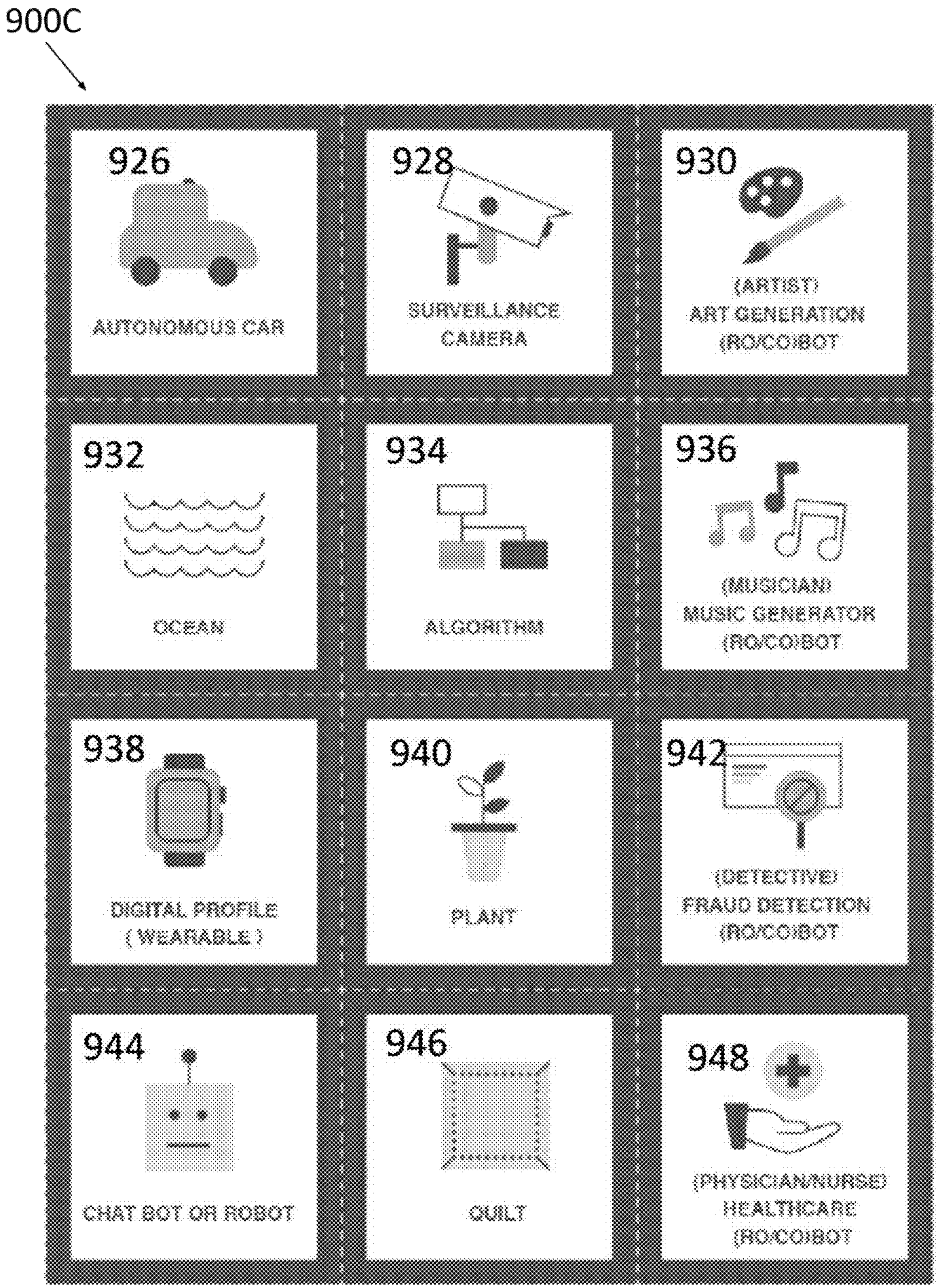

Although exemplary selections are shown in FIGS. 9A-9C, the present disclosure contemplates any selections (including multiple selections) can be provided to a user, as known in the art. For example, although particular algorithms are shown on screen 900B, any machine learning or artificial intelligence algorithm, as known in the art, can be used in the various embodiments of the present disclosure. In another example, although particular systems and medium are shown in screen 900C, the present disclosure contemplates that any system and/or output medium can be used by the disclosed AI tool, according to the various embodiments of the present disclosure.

Implementations

The disclosed AI tool can be an in-browser generator and/or a software application, which can be used in Virtual Reality, XR, Augmented Reality and/or real life. The present disclosure also contemplates that the disclosed AI tool can be operated in any form as known in the art. In other examples, it could be any computer program running on any computing device.

Exemplary Designer Mode

Figure 6A:
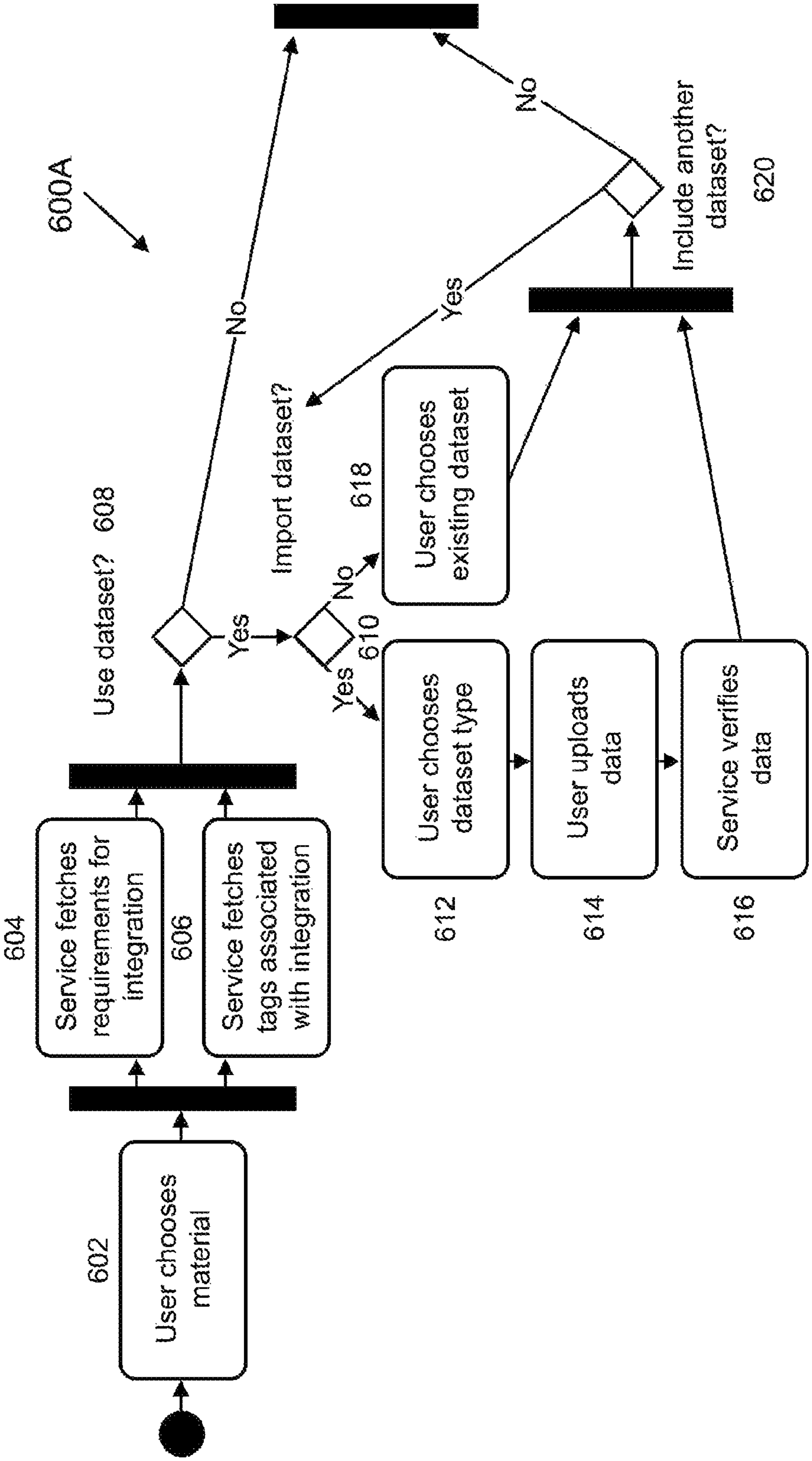
FIGS. 6A-6B show an exemplary methodology for a user to build an AI system, according to an embodiment of the present disclosure.
Figure 6B:
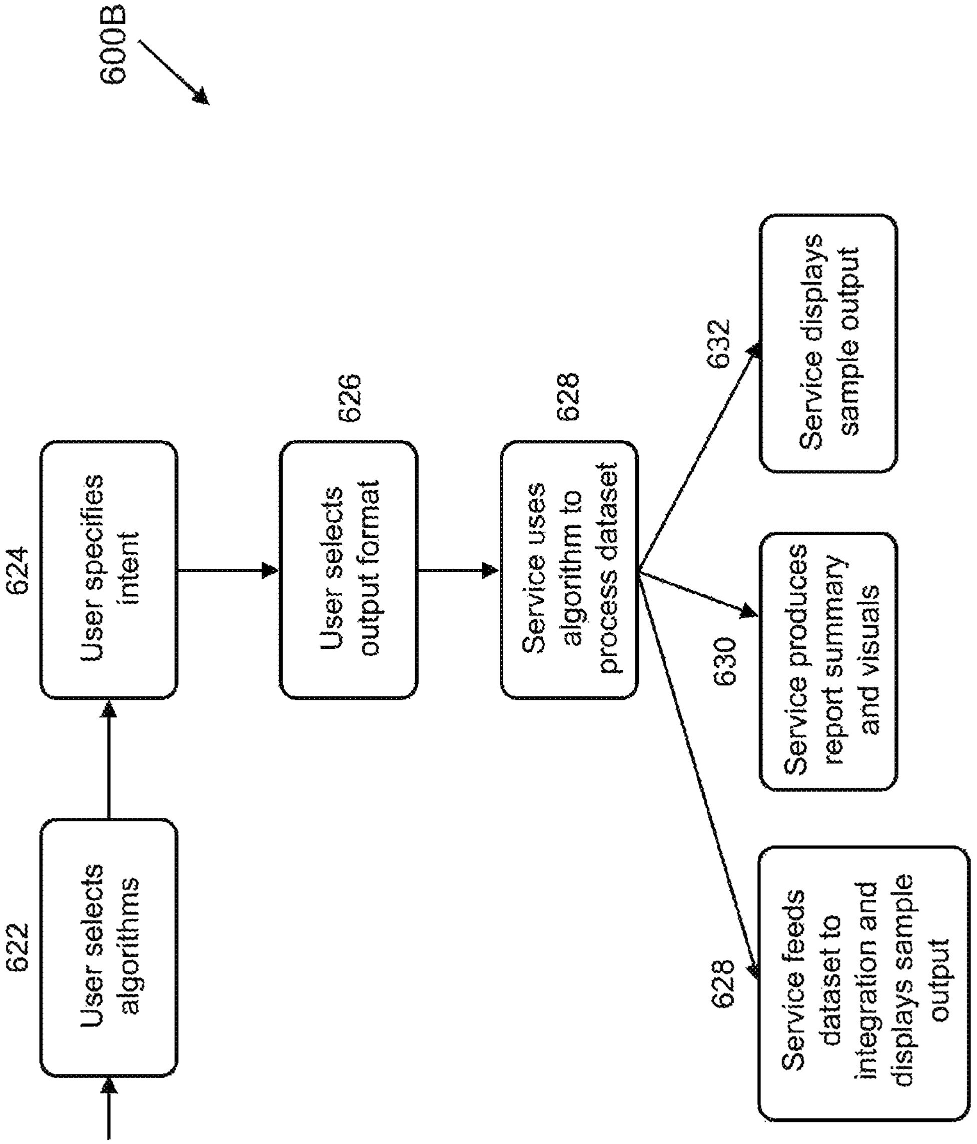

FIGS. 6A-6B show an exemplary methodology 600 for a user to build an AI system, according to another embodiment of the present disclosure. Methodology 600 can be the designer/prototyper mode. In an exemplary methodology 600, a user starts with a pre-determined AI design question or approach. For example, a user can intend to create transparency regarding the utilization of emotions analysis in voice interfaces. As discussed below, methodology 600 uses deep learning, the design question, any keywords and/or input data (whether user created or uploaded from an existing dataset) to (1) identify patterns, and (2) make comparisons with both labeled and unlabeled data in order to create new labels, relationships, models and/or context.

At step 602, the user identifies the material. Materials take both physical and digital forms in the design. The hardware of a product may lend itself to the utilization of specific data/models/algorithms intended for that specific product. For example, digital material includes a software application, a hardware device, or any other product utilizing Artificial Intelligence. In some examples, the materials comprise the form of the system; with more embodied AI devices, the materials and form themselves affect how the disclosed AI tool produces output. In some examples, the materials can produce the form.

In some examples of step 602, the user makes decisions regarding how and what will be designed. For example, if the user wants to design for a product like Amazon's cloud-based voice service, Alexa, only specific design choices will be available based on that product.

Once the material is chosen at step 602, the design tool (or service) fetches the requirements for the integration at step 604. In some examples, at step 606, the design tool can also retrieve any tagging information related to the material (or product) chosen in step 602.

At step 608, the user is then prompted to include data by one or many of these options: from existing data sets (step 618), user created data sets step (612). In other examples (not shown) the user can select real time data from a sensor or data from an API. The input can also include any AI tagging (or metadata) provided by any other product.

At step 612, the user creates a specific data type and then uploads the data type at step 614, having it verified by the service/design tool at step 616. Therefore, the data type conforms to the material chosen in step 602. The user can upload pre-existing data sets that conform to the new data type. Exemplary datasets include, for example:

https://docs.aws.amazon.com/AWSEC2/latest/APIReference/API_Types.html; and https://www.ibm.com/support/knowledgecenter/en/SS9PF4_1.1.0.4/src/tpc/mlz_algorithms.html;

In some examples, multiple datasets can be used at step 620.

In some examples of methodology 600 (not shown), the user is then prompted to enter a "consideration input" and/or an intent at step where they can add cultural context, ethics, etc. (any variable that should be considered in the design process). These input considerations will be output at the end, and can also be used to highlight information throughout the design that might be relevant to that consideration. There are several benefits to entering the "consideration input", the primary benefit is to build ethics, culture and bias controls into the design. In some examples of methodology 600, the users are reminded to design with and for these input considerations throughout the design process and not only at step.

At step 622, the user is provided with learning algorithms, which are populated by the material. Inputs to the learning algorithms (or models produced by these learning algorithms) can be existing datasets, user uploaded data sets, real-time sensor information, API's, and the design question/key words (or any other input as discussed above with respect to step 110 of FIG. 1). The input can also include any AI tagging (meta data) provided by a specific product (discussed further below). The user can train data locally with open source SDKs and/or scale using cloud services.

At step 624, the user identifies an intent, which reflects the intention of the design.

In some examples (not shown) the tool prompts users to identify a personal culture of the users, and/or a culture that the user is designing for. The tool can analyze and adapt later prompts to the user based on this input.

At step 626, the user identifies the format of the output.

At step 628, the service feeds a dataset to integrate and display in the sample output. There are many possible outputs from this tool. One output, shown at step 628, is a prototype built on an SDK with the data the user suggested (in the form of suggested code, API, AI Tagging and/or written information). Additional outputs (not shown) can include hardware, physical material, or auditory noise.

Another output is auto-generated analysis/visualization (a report summary with visuals), shown at step 630. This report can include technical and social/cultural considerations. In the report, the output can also highlight issues of concern with the AI design process or designed biases in data, models and demographic information about the creators. An exemplary output according to step 630 can provide a recommendation to utilize pitch changing to identify the presence of an algorithm (earcon). The report can include suggestions of pitch changing libraries. Step 630 can further provide for populating the output.

At step 632, the service then displays the sample output.

AI Tagging

In one embodiment of the present disclosure, the tool provides AI tagging (also referred to as meta tagging). AI tagging includes receiving content descriptors of (1) the algorithms/models, (2) input data used in the design of existing AI systems, (3) the demographic information of the humans or machines proposing the AI system, and (4) who created the materials and form of the AI system. The disclosed tool uses the AI tags to increase algorithmic transparency by providing data, algorithm/model information in the design and development process of an AI system. The disclosed tool also provides for tagging created AI systems with the demographics of the creators, content descriptors of the algorithms used, and/or content descriptors of the input data used. Therefore, the disclosed AI tool provides pre-build non-technical considerations AI system design, giving these considerations equal importance to the technical algorithm selection. Output from the disclosed AI tool therefore reduces unwanted bias that exists in conventionally-designed AI systems. The output can be displayed, felt, or heard through various devices (e.g., phones, embedded haptics in clothing, and/or sound produced in location specific ML systems)

Examples of this AI Tagging include:

<AI nativedata="Alexa SDK">

<AI data="gesture data from UCLA: trained on: gender (90% male-identified, 10% decline to state) and race FIGS. 95% Caucasian, 5% Asian)">

<AI algorithm="supervised/SVM">

<AI contextcreation="Design Company team: gender (90% male-identified) and race (75% caucasian and 25% decline to state">

<AI locationcreation="90% SanFrancisco, CA, United States: 10% Chennai, India">

In some embodiments, AI tagging is incorporated at the beginning of the AI design process (e.g. before step 110 of FIG. 1, or before steps 310 and 410 of FIGS. 3 and 4, respectively), when the user imports information from a specific product and/or dataset. In other embodiments, AI tagging is output from the design tool.

In some examples, the disclosed AI tool receives AI tagging data from a user in his home, at a worksite, through a user's mobile device, through a scanner, through an RFID chip embedded in a computing device. In some examples, the user can access the AI tags through any of these devices, or while viewing a system in augmented realities. In other examples, a user receives a text message identifying the bias. Any other method for uploading an AI tag or displaying AI tagging can be used as well, as contemplated by one skilled in the art.

Form/Material/Medium Alternatives

Different media types afford the utilization of specific types of algorithms or AI development frameworks.

AI Design Tool Across Environments

Data collection has tremendous implications on user privacy and significantly effects conventional AI designs regarding culture and transparency. User privacy concerns change how users design, accept, contribute to, and opt into information, data, and models.

The disclosed AI tool provides for collecting data insights from multiple and varied realities in order to expand the reach of an AI system beyond conventional AI systems. This data provides more holistic cultural perspectives on the roles of user bodies, location, thinking about feelings, and user interaction with color; this holistic perspective provided by the disclosed AI tool provides a different cultural perspective for users than conventional AI systems.

In some examples, the disclosed AI tool receives user-rated data (e.g., embodied data sorting) or other reviews of conventionally-designed AI systems. The disclosed tool then identifies patterns in sorting to determine how the salience of objects and media varies across cultures.

The present disclosure provides additional examples of collecting data across realities, including:

Augmented Reality Data Collection—For example, the AI tool collects location-based feeling placement, when users identify where they would like to tag a feeling, by dropping a color-coded feeling in a specific location. Users can leave information in locations that can then be collected and used for a more complicated AI system, which can build across multiple data streams, across multiple realities to focus on more embodied AI experiences.

Virtual Reality Data Collection—Virtual reality data collection can be collected similarly to augmented reality data collection, as would be readily contemplated by one skilled in the art.

XR—"X" can expand across senses; some examples include biometric and other natural physical realities.

FIG. 8 provides a chart 800 showing how different data can be collected across realities. For example, chart 800 shows the datasets: media 802, behavior 804, material 806, reality type 808, and artificial intelligence model 810. An exemplary artificial intelligence model 810 can include one type of media 802, one behavior 804, one material 806, and one reality type 808.

For example, a collection and unsupervised learning artificial intelligence model can use textual media, throwing behavior, a phone as material, and data collected from real life.

For example, a data-sorting artificial intelligence model can receive media input from textual media, audio media, video media, and 3-D object media. The data-sorting artificial intelligence model can use visio-spatial sort behavior, use headset/controller material, and a virtual reality implementation.

For example, an AI system which provides output for an individual experience (i.e., a teaching model) can use 3-D objects in physical space, can cause the items to place and/or receive, can use a phone or tablet, and provide augmented realities.

In another example, an AI system which provides output for a collective experience provides a photon (i.e., electric communication) and a phone/tablet. The AI system is provided in Internet of Things augmented reality.

Contextual Normalcy

In one embodiment of the present disclosure, the AI design tool provides an interactive experience for a group of users around the world (for example, the group of users can be diverse). The AI design tool provides a set of questions to the group of users and receives personal refinement from each user. The set of questions can be directed towards the user's feelings. The questions range from general cultural concepts of feelings (e.g., "How would your community describe 'feeling average'?") to more personal ideas about how the users feel (eg., "How do you know you feel blue or melancholy?"). The AI design tool collects responses over an extended period of time. This information can be sorted or analyzed using various models, including supervised learning or unsupervised learning. For example, the AI design tool groups together keywords from the iterations of questions (much like a flocking algorithmic script).

From these groupings of culturally specific questions, the AI design tool (1) predicts which questions a particular user will be comfortable answering, according to the groupings; and (2) prompt a user to consent to any of a plurality of public disclosures of the user's data AFTER the user has honestly answered the question. Therefore, unlike conventional data collection systems which first require a user to opt-in to disclosure before the user has provided any information, the disclosed design tool provides a platform for users to first disclose their information and then decide what they are interested in sharing. Therefore, the disclosed design tool ensures greater accuracy in user responses over conventional systems.

With the grouped questions and the user responses, the disclosed AI tool examines emotional and behavioral patterns to determine future questions and to determine which questions should be provided to which users. Therefore, the disclosed AI tool provides a system for users to engage with feelings and develop their emotional health.

Additionally, the AI design tool reveals the assumptions in the design and development of conventional systems by increasing AI literacy through user workshops reliant on the disclosed tool. Using this tool, conventional approaches to AI development and design can be deconstructed; the tool can create new approaches; and the tool redefines and provides alternatives to existing problematic knowledge systems.

Using questions and data, the disclosed AI tool can identify response patterns to show traits of reported feelings across cultures and different demographics. The speculative, interactive, and design practices of the disclosed AI tool provides alternative embodiments than conventional treatments for mental health diagnosis and treatment.

In some examples of this embodiment, the disclosed AI tool collects and organizes different types of data across different realities or environments. For example, the AI design tool can collect data from crowd sourcing, embodied data sorting in virtual reality, and location-based feeling placement in augmented reality (e.g., the user drops a color-coded feeling in specific locations). The disclosed AI tool can use the data from each reality to provide a different strength for data collection.

User Testing

In some examples, the disclosed AI tool provides an interface for users to see how their responses to a question compare with (1) their previous response and (2) other responses around the world. Some embodiments include keyword search options and visualizations.

Mental Health Embodiment

Therefore, a tool according to the present disclosure develops a AI tool to diagnose depression; the developed tool has a lower bias than conventional diagnostic methods. The disclosed tool provides embodiments focusing on mental health for bots, browsers, digital materials, smart materials, haptics, handwriting, spoken words, and locations.

An exemplary tool according to this embodiment can take as input: (1) crowdsourced data about user feelings, (2) user thoughts about their feelings, (3) location data, (4) varied voluntary demographic information, and (5) clinical research regarding keyword patterns found in existing diagnostic systems and assessments. In some examples, the present tool provides for unwanted bias reduction by examining who designed the data collection, who contributed to the data, who created the models, which models where used, and why.

The exemplary tool provides supervised and unsupervised learning with more data collection. In an exemplary embodiment, the disclosed AI tool selects the algorithm to analyze the data based on the AI's database collection.

The exemplary tool provides a plurality of output options, including (1) visualization, (2) alternative information for inputs, (2) new words, (4) new classifications, (5) new language of emotions, (6) data from a contextual normalcy (according to the contextual normalcy embodiment discussed above, (7) data from an augmented reality distributed emotion application, and (8) intelligent location-based experiences.

Therefore, an embodiment of the present tool provides data primarily focused on individual and collective cultures.

Machine Learning

Various aspects of the present disclosure can be performed by a machine-learning algorithm, as readily understood by a person skilled in the art. In some examples, the steps 120 and 130 of FIG. 1, steps 320 and 330 of FIG. 3, steps 420 and 430 of FIG. 4, and steps 510 and 540 of FIG. 5 can be performed by a supervised or unsupervised algorithm. For instance, the system may utilize more basic machine learning tools including (1) decision trees ("DT"), (2) Bayesian networks ("BN"), (3) artificial neural network ("ANN"), or (4) support vector machines ("SVM"). In other examples, deep learning algorithms or other more sophisticated machine learning algorithms, e.g., convolutional neural networks ("CNN"), or capsule networks ("CapsNet") may be used.

DT are classification graphs that match input data to questions asked at each consecutive step in a decision tree. The DT program moves down the "branches" of the tree based on the answers to the questions (e.g., First branch: Does the dataset comprise widely representative data? yes or no. Branch two: Is the dataset missing a specific racial/ethnic group? yes or no, etc.).

Bayesian networks ("BN") are based on likelihood something is true based on given independent variables and are modeled based on probabilistic relationships. BN are based purely on probabilistic relationships that determine the likelihood of one variable based on another or others. For example, BN can model the relationships between input datasets, output datasets, material, and any other information as contemplated by the present disclosure. Using an efficient BN algorithm, an inference can be made based on the input data.

Artificial neural networks ("ANN") are computational models inspired by an animal's central nervous system. They map inputs to outputs through a network of nodes. However, unlike BN, in ANN the nodes do not necessarily represent any actual variable. Accordingly, ANN may have a hidden layer of nodes that are not represented by a known variable to an observer. ANNs are capable of pattern recognition. Their computing methods make it easier to understand a complex and unclear process that might go on during predicting a body position of the user based a variety of input data.

Support vector machines ("SVM") came about from a framework utilizing of machine learning statistics and vector spaces (linear algebra concept that signifies the number of dimensions in linear space) equipped with some kind of limit-related structure. In some cases, they may determine a new coordinate system that easily separates inputs into two classifications. For example, a SVM could identify a line that separates two sets of points originating from different classifications of events.

Deep neural networks (DNN) have developed recently and are capable of modeling very complex relationships that have a lot of variation. Various architectures of DNN have been proposed to tackle the problems associated with algorithms such as ANN by many researchers during the last few decades. These types of DNN are CNN (Convolutional Neural Network), RBM (Restricted Boltzmann Machine), LSTM (Long Short Term Memory) etc. They are all based on the theory of ANN. They demonstrate a better performance by overcoming the back-propagation error diminishing problem associated with ANN.

Machine learning models require training data to identify the features of interest that they are designed to detect. For instance, various methods may be utilized to form the machine learning models, including applying randomly assigned initial weights for the network and applying gradient descent using back propagation for deep learning algorithms. In other examples, a neural network with one or two hidden layers can be used without training using this technique.

In some examples, the machine learning model can be trained using labeled data, or data that represents certain user input. In other examples, the data will only be labeled with the outcome and the various relevant data may be input to train the machine learning algorithm.

For instance, to determine whether a particular regulation fits the input data, various machine learning models may be utilized that input various data disclosed herein. In some examples, the input data will be labeled by having an expert in the field label the relevant regulations according to the particular situation. Accordingly, the input to the machine learning algorithm for training data identify various legal regulations as 'relevant' or 'non-relevant'.

Supervised Learning: The disclosed AI tool provides for using supervised learning to engage in classification. For example, the tool pairs keywords from questions with the primary feeling word in a particular question, and uses this as training data.

Unsupervised Learning: In another embodiment of the disclosed tool, the tool removes keyword pairs and determines what patterns emerge.

Local Hardware Model

The present disclosure contemplates that a local hardware model can be used to provide various embodiments of the present disclosure. For example, the disclosed AI tool can be provided for an electromechanical device which allows a user to create and follow associative trails of links and personal annotations while interacting with the disclosed AI tool. Such a local hardware model can mimic the associate processes of the human brain (or the local hardware model mirrors other natural systems), and allow a user to better learn how to construct and deconstruct AI systems. For example, electro-mechanical controls and display device scan be integrated into a desk. Such a local hardware model can provide haptic, tactile, auditory, physical, and visual feedback to a user. Feedback can additionally be provided across realities.

Computer & Hardware Implementation of Disclosure

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some examples, the present disclosure contemplates any of the following networks (or a combination of the networks), including: a distributed network, a decentralized network, an edge network, a federated network, and/or a mesh network.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), mesh networks, and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry.

Other examples of processors include AI hardware devices.

CONCLUSION

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A computer-implemented method, comprising:

receiving input, by one or more processors of a computing device and from a communications channel at an interface on the computing device, wherein the input comprises a dataset, metadata comprising AI tags comprising machine-readable content descriptors, demographic information, input data, context descriptors, and technical data corresponding to the dataset, and an output medium;

selecting, by the one or more processors, and based on each of (i) the received dataset, (ii) the metadata corresponding to the dataset, and (iii) the output medium, at least one algorithm selected from a plurality of algorithms, including: a decision tree, a Bayesian network, an artificial neural network, a support vector machine, a convolutional neural network, and a capsule network;

training, via the one or more processors of the computing device, the at least one algorithm using the received dataset, the metadata corresponding to the dataset, and the output medium with the at least one algorithm to yield an output, wherein the output comprises a trained artificial intelligence system, the received dataset, and the output medium;

applying, via the one or more processors of the computing device, a trained machine learning algorithm to generate an inference based at least on the metadata characterizing a relationship between the received dataset and the output;

determining, via the one or more processors of the computing device, and based on the inference, whether the trained artificial intelligence system comprises at least one unwanted bias in a plurality of biases using pattern recognition, wherein the plurality of biases comprise two or more of social biases, cultural biases, gender biases, racial biases and interaction biases;

identifying, by the one or more processors, a portion of the received input corresponding to the determined unwanted bias based on determining that the artificial intelligence system comprises the at least one unwanted bias, wherein identifying the portion of the received input corresponding to the determined unwanted bias further comprises processing the metadata corresponding to the dataset using the trained machine learning algorithm, wherein the metadata comprises identification of the at least one unwanted bias in the plurality of biases;

providing the artificial intelligence system and the identified portion of the received input corresponding to the determined unwanted bias at the interface on the computing device;

removing, by the one or more processors, the identified portion from the received input to yield updated input;

retrieving, via the one or more processors of the computing device, supplementary input data in a database of artificial intelligence systems, wherein the supplementary input data corresponds to the identified portion of the received input and does not comprise the at least one unwanted bias; and retraining, via the one or more processors of the computing device, the at least one algorithm using the supplementary input data, a second dataset, and supplementary metadata comprising AI tags and corresponding to (i) the second dataset, and (ii) the supplementary input data to yield an updated output, wherein the updated output comprises an updated artificial intelligence system that does not comprise the at least one unwanted bias.

2. The method of claim 1, wherein selecting at least one algorithm further comprises:

determining whether the received input corresponds to requirements associated with each algorithm in the plurality of algorithms; and selecting algorithms of the plurality of algorithms, based on determining that the received input corresponds to requirements associated with the selected algorithms.

3. The method of claim 1, wherein the input further comprises any of: a format for the output, a supplementary dataset, a type of the dataset, and input consideration variables.

4. The method of claim 1, wherein the at least one algorithm comprises an artificial intelligence model selected from a plurality of artificial intelligence approaches, including: an artificial narrow intelligence approach, a non-symbolic artificial intelligence approach, a symbolic artificial intelligence approach, a hybrid symbolic and non-symbolic artificial intelligence approach, and a statistical artificial intelligence approach.

5. The method of claim 1, wherein the at least one algorithm was trained, via the computing device, on a subset of a database of artificial intelligence systems, the subset comprising artificial intelligence systems with at least one of: datasets comprising metadata corresponding to metadata of the received dataset, and the output medium.

6. The method of claim 1, wherein the output further comprises:

an indication of whether the at least one algorithm successfully processed the received input.

7. The method of claim 1, further comprising:

displaying the supplementary input data at the interface on the computing device.

8. The method of claim 1, further comprising:

displaying the updated output at the interface on the computing device.

9. A method, comprising:

receiving input, by one or more processors of a computing device and from a communications channel at an interface on the computing device, wherein the input comprises an artificial intelligence system comprising at least one algorithm selected from a plurality of algorithms, including: a decision tree, a Bayesian network, an artificial neural network, a support vector machine, a convolutional neural network, and a capsule network;

determining, via the one or more processors of the computing device, and based on an inference characterizing the received artificial intelligence system generated by an application of a trained machine learning algorithm, whether metadata comprising AI tags comprising machine-readable content descriptors, demographic information, input data, context descriptors, and technical data associated with the received artificial intelligence system comprises at least one unwanted bias in a plurality of biases using pattern recognition, wherein the plurality of biases comprise two or more of social biases, cultural biases, gender biases, racial biases and interaction biases;

identifying, by the one or more processors, a portion of the received artificial intelligence system corresponding to the at least one unwanted bias, wherein identifying the portion of the received input corresponding to the determined unwanted bias further comprises processing the metadata using the trained machine learning algorithm, wherein the metadata comprises identification of the at least one unwanted bias in the plurality of biases;

displaying, at the interface on the computing device, the identified portion and the at least one unwanted bias;

retrieving, via the one or more processors of the computing device, supplementary input data from a database of artificial intelligence systems, wherein the supplementary input data corresponds to the identified portion of the received input and does not comprise the at least unwanted one bias;

displaying the supplementary input data at the interface on the computing device;

receiving a request, via the interface for the computing device, to process a second selection of input data comprising the received input with the supplementary input data in place of the identified portion; and training, via the one or more processors of the computing device, the artificial intelligence system using the second selection of input data to yield an output, wherein the output is an updated artificial intelligence system that does not comprise the at least one unwanted bias.

10. The method of claim 9, further comprising:

displaying the output at the interface on the computing device.

11. A non-transitory computer-readable medium in which is embedded computer-readable code that when loaded on a computing device causes the computing device to perform the steps of:

receiving input, by one or more processors of the computing device and from a communications channel at an interface on the computing device, wherein the input comprises a dataset, metadata comprising AI tags comprising machine-readable content descriptors, demographic information, input data, context descriptors, and technical data corresponding to the dataset, and an output medium;

selecting, by the one or more processors, and based on each of (i) the received dataset, (ii) the metadata corresponding to the dataset, and (iii) the output medium, at least one algorithm selected from a plurality of algorithms, including: a decision tree, a Bayesian network, an artificial neural network, a support vector machine, a convolutional neural network, and a capsule network;

training, via the one or more processors of the computing device, the at least one algorithm using the received dataset, the metadata corresponding to the dataset, and the output medium with the at least one algorithm to yield an output, wherein the output comprises a trained artificial intelligence system, the received dataset, and the output medium;

applying, via the one or more processors of the computing device, a trained machine learning algorithm to generate an inference based at least on the metadata characterizing a relationship between the received dataset and the output;

determining, via the one or more processors of the computing device, and based on the inference, whether the artificial intelligence system comprises at least one unwanted bias in a plurality of biases using pattern recognition, wherein the plurality of biases comprise two or more of social biases, cultural biases, gender biases, racial biases and interaction biases;

identifying, by the one or more processors, a portion of the received input corresponding to the determined unwanted bias based on determining that the artificial intelligence system comprises the at least one unwanted bias, wherein identifying the portion of the received input corresponding to the determined unwanted bias further comprises processing the metadata corresponding to the dataset using the trained machine learning algorithm, wherein the metadata comprises identification of unwanted biases in the plurality of biases corresponding to each of the received input;

providing the artificial intelligence system and the identified portion of the received input corresponding to the determined unwanted bias at the interface on the computing device;

removing, by the one or more processors, the identified portion from the received input to yield updated input;

retrieving, via the one or more processors of the computing device, supplementary input data in a database of artificial intelligence systems, wherein the supplementary input data corresponds to the identified portion of the received input and does not comprise the at least one unwanted bias; and retraining, via the one or more processors of the computing device, the at least one algorithm using the supplementary input data, a second dataset, and supplementary metadata comprising AI tags and corresponding to (i) the second dataset, and (ii) the supplementary input data to yield an updated output, wherein the updated output comprises an updated artificial intelligence system that does not comprise the at least one unwanted bias.

12. The non-transitory computer-readable medium of claim 11, further comprising:

displaying the supplementary input data at the interface on the computing device.

13. The non-transitory computer-readable medium of claim 12, further comprising:

displaying the updated output at the interface on the computing device.

14. The non-transitory computer-readable medium of claim 11, wherein identifying the portion of the received input corresponding to the determined unwanted bias further comprises:

processing metadata associated with each of the received input, wherein the metadata comprises identification of unwanted biases in the plurality of biases corresponding to each of the received input.

15. A non-transitory computer-readable medium in which is embedded computer-readable code that when loaded on a computing device causes the computing device to perform the steps of:

receiving input, by one or more processors of the computing device and from a communications channel at an interface on the computing device, wherein the input comprises an artificial intelligence system comprising at least one algorithm selected from a plurality of algorithms, including: a decision tree, a Bayesian network, an artificial neural network, a support vector machine, a convolutional neural network, and a capsule network;

determining, via the one or more processors of the computing device, and based on an inference characterizing the received artificial intelligence system generated by an application of a trained machine learning algorithm, whether metadata comprising AI tags comprising machine-readable content descriptors, demographic information, input data, context descriptors, and technical data associated with the received artificial intelligence system comprises at least one unwanted bias in a plurality of biases using pattern recognition, wherein the plurality of biases comprise two or more of social biases, cultural biases, gender biases, racial biases and interaction biases;

identifying, by the one or more processors, a portion of the received artificial intelligence system corresponding to the at least one unwanted bias, wherein identifying the portion of the received input corresponding to the determined unwanted bias further comprises processing the metadata using the trained machine learning algorithm, wherein the metadata comprises identification of the at least one unwanted bias in the plurality of biases;

displaying, at the interface on the computing device, the identified portion and the at least one unwanted bias;

retrieving, via the one or more processors of the computing device, supplementary input data from a database of artificial intelligence systems, wherein the supplementary input data corresponds to the identified portion of the received input and does not comprise the at least one unwanted bias;

displaying the supplementary input data at the interface on the computing device;

receiving a request, via the interface for the computing device, to process a second selection of input data comprising the received input with the supplementary input data in place of the identified portion; and training, via the one or more processors of the computing device, the artificial intelligence system using the second selection of input data to yield an output, wherein the output is an updated artificial intelligence system that does not comprise the at least one unwanted bias.

16. The method of claim 1, wherein the plurality of biases comprise one or more of social biases, cultural biases, gender biases, racial biases, and interaction biases created through usage over time.

17. The method of claim 9, wherein the plurality of biases comprise one or more of social biases, cultural biases, gender biases, racial biases, and interaction biases created through usage over time.

18. The non-transitory computer-readable medium of claim 11, wherein the plurality of biases comprise one or more of social biases, cultural biases, gender biases, racial biases, and interaction biases created through usage over time.

19. The non-transitory computer-readable medium of claim 15, wherein the plurality of biases comprise one or more of social biases, cultural biases, gender biases, racial biases, and interaction biases created through usage over time.

20. The method of claim 1, wherein the trained machine learning algorithm is a trained neural network.

21. The method of claim 9, wherein the trained machine learning algorithm is a trained neural network.

22. The non-transitory computer-readable medium of claim 11, wherein the trained machine learning algorithm is a trained neural network.

23. The non-transitory computer-readable medium of claim 15, wherein the trained machine learning algorithm is a trained neural network.

24. The method of claim 1, wherein the AI tags comprise content descriptors of one or more of the input dataset, the second dataset, and the supplementary input data.

25. The non-transitory computer-readable medium of claim 11, wherein the AI tags comprise content descriptors of one or more of the input dataset, the second dataset, and the supplementary input data.

26. The method of claim 1, wherein the dataset comprises real time data.

27. The non-transitory computer-readable medium of claim 11, wherein the dataset comprises real time data.

28. The method of claim 1, wherein the input comprises one or more selected from the group comprising a software application, a hardware device, a product utilizing artificial intelligence.

29. The non-transitory computer-readable medium of claim 11, wherein the input comprises one or more selected from the group comprising a software application, a hardware device, a product utilizing artificial intelligence.

30. The method of claim 1, wherein the input comprises a physical form.

31. The non-transitory computer-readable medium of claim 11, wherein the input comprises a physical form.

32. The method of claim 9, wherein the AI tags comprise content descriptors of the received artificial intelligence system.

33. The non-transitory computer-readable medium of claim 15, wherein the AI tags comprise content descriptors of the received artificial intelligence system.

* * * * *